US012739222B2

(12) United States Patent
Abreu et al.

(10) Patent No.: US 12,739,222 B2
(45) Date of Patent: Sep. 15, 2026

(54) SIMULTANEOUS UNINTERRUPTED MEDIA PLAY, SOCIAL NETWORKING AND CALL MANAGEMENT USER INTERFACE

(71) Applicants: Osvaldo Abreu, Shirley, NY (US); Elvis Abreu, Shirley, NY (US)

(72) Inventors: Osvaldo Abreu, Shirley, NY (US); Elvis Abreu, Shirley, NY (US)

( * ) Notice: Subject to any disclaimer, the term of this patent is extended or adjusted under 35 U.S.C. 154(b) by 224 days.

(21) Appl. No.: 18/811,874

(22) Filed: Aug. 22, 2024

(65) Prior Publication Data

US 2024/0414262 A1 Dec. 12, 2024

Related U.S. Application Data

(63) Continuation of application No. 18/761,353, filed on Jul. 2, 2024, which is a continuation of application (Continued)

(51) Int. Cl.

| | |
|---|---|
| ***H04L 51/224*** | (2022.01) |
| ***H04M 1/72484*** | (2021.01) |
| ***H04M 3/42*** | (2006.01) |

(52) U.S. Cl.

CPC ...... *H04L 51/224* (2022.05); *H04M 1/72484* (2021.01); *H04M 3/42042* (2013.01); *H04M 2203/2011* (2013.01)

(58) Field of Classification Search

CPC ........... H04M 1/7243; H04M 1/72448; H04M 1/575; H04M 1/72403; H04M 2201/42; H04M 2203/2038; H04M 3/436; H04M 3/53333; H04M 3/537; H04M 3/53358; H04M 1/724; H04M 7/0024; H04M 1/72484; H04M 3/42042; H04M 2203/2011; H04L 51/224; H04L 41/22; H04L 51/58; H04L 67/60; H04L 65/61; H04L 65/611; H04L 51/52; H04L 67/63; H04W 68/005; H04W 4/23

See application file for complete search history.

(56) References Cited

U.S. PATENT DOCUMENTS

2009/0293079 A1* 11/2009 McKee .................. H04L 51/22
2011/0177829 A1* 7/2011 Platt ........................ H04W 4/23
455/456.2

(Continued)

*Primary Examiner* — Lana N Le

(57) ABSTRACT

A method and an electronic device employing an uninterrupted media play and call management system (UMPCMS) are provided for managing an incoming call without interrupting playing of media on the electronic device. The UMPCMS receives an indication of the incoming call, generates a notification object with one or more call management options for the incoming call in a configurable format based on preconfigured criteria, and overlays the generated notification object with the call management options on a graphical user interface (GUI) provided by the UMPCMS, while supporting continued playing of the media on the electronic device via the GUI without interruption by the incoming call. The UMPCMS receives a selection of a call management option from the electronic device and performs one or more executable actions on the incoming call and/or the playing of the media on the electronic device based on the received selection of the call management option.

32 Claims, 18 Drawing Sheets

Related U.S. Application Data

No. 18/117,307, filed on Mar. 3, 2023, which is a continuation of application No. 17/892,053, filed on Aug. 20, 2022, now Pat. No. 12,289,281, which is a continuation of application No. 14/971,979, filed on Dec. 16, 2015, now Pat. No. 11,425,079.

(60) Provisional application No. 62/092,278, filed on Dec. 16, 2014.

(56) References Cited

U.S. PATENT DOCUMENTS

| | | | | |
|---|---|---|---|---|
| 2012/0134480 | A1* | 5/2012 | Leeds | H04M 3/420<br>379/88.14 |
| 2013/0312035 | A1* | 11/2013 | Stallings | H04M 7/24 |
| 2013/0326373 | A1* | 12/2013 | Lisabeth | H04L 51/52 |
| 2017/0134784 | A1* | 5/2017 | Davis | H04M 7/24 |

* cited by examiner

SIMULTANEOUS UNINTERRUPTED MEDIA PLAY, SOCIAL NETWORKING AND CALL MANAGEMENT USER INTERFACE

CROSS-REFERENCE TO RELATED APPLICATIONS

This patent application is a continuation of U.S. patent application Ser. No. 18/761,353, filed by Osvaldo Rodamez Abreu and Elvis Abreu on Jul. 2, 2024, entitled "Uninterrupted Media Play and Call Management Calendar User Interface." This patent application incorporated herein in its entirety. U.S. patent application Ser. No. 18/761,353 is a continuation of U.S. patent application Ser. No. 18/117,307, filed by Osvaldo Rodamez Abreu and Elvis Abreu on Mar. 3, 2023, entitled "Uninterrupted Media Play and Call Management Text User Interface." This patent application incorporated herein in its entirety. U.S. patent application Ser. No. 18/117,307 is a continuation of U.S. patent application Ser. No. 17/892,053, filed by Osvaldo Rodamez Abreu and Elvis Abreu on Aug. 20, 2022, entitled "Uninterrupted Media Play and Call Management User Interface". U.S. patent application Ser. No. 17/892,053 is a continuation of U.S. patent application Ser. No. 14/971,979, filed by Elvis Abreu and Osvaldo Rodamez Abreu on Dec. 16, 2015, entitled "Simultaneous Uninterrupted Media Play and Call Management", now U.S. Pat. No. 11,425,079, issued on Aug. 23, 2022, this patent application incorporated herein in its entirety. U.S. patent application Ser. No. 14/971,979 claims priority to and the benefit of the provisional patent application No. 62/092,278 titled "Simultaneous Uninterrupted Activity And Call Management", filed in the United States Patent and Trademark Office on Dec. 16, 2014. The specification of the above referenced patent application is incorporated herein by reference in its entirety.

BACKGROUND OF THE INVENTION

In recent years, there has been a growing use of computing devices, for example, smartphones, smart watches, tablet computing devices, personal digital assistants, and other communication devices, for multiple applications comprising, for example, streaming video and live television broadcasts in addition to communication. The mobile boom has brought about substantial changes in the usage of smartphones, and therefore wireless carriers have had to adjust to an increasing need for video streaming, television watching, and general data consumption on a smartphone. A significant percentage of traffic on video sharing web sites, for example, YouTube® of Google Inc., is now being received through mobile devices. A significant number of people now watch videos on their tablets and mobile phones. For example, fifteen percent of online video hours globally are spent on tablets and smartphones. Video sharing websites account for nearly one fifth of all mobile data traffic. Channels that are focused on video and computer gaming have a global audience of about 200 million people. Moreover, one third of all home broadband internet traffic is typically generated by videos watched on on-demand internet streaming media providers such as NETFLIX® of Netflix, Inc. Further support is the recent merge between the wireless carrier AT&T Inc., and the broadcasting network DIRECTV, LLC. This merge is further evidence of smartphone users plugging in to watch their favorite broadcasts.

Wireless carriers have transitioned from second generation to third generation, fourth generation, and long term evolution communication technologies and will soon adopt a fifth generation communication technology to keep up with the increasing demand for video watching and data usage. The wireless carriers have had to adjust their infrastructure by installing new antennae, cabinets, fiber, etc., to all their wireless communication facilities to adjust to the increasing demand for video watching and data usage. In view of the above described increasing need for video streaming, television watching, and general data consumption on mobile devices, there is a need for allowing users to watch a video or a live broadcast on a user device and receive a call, a text message, an electronic mail (email), or any other communicative event simultaneously without being interrupted by a notification of the event and to respond to a sender of the communicative event while still watching the video or live broadcast without interruption. Many television broadcasting channels are now creating applications for consumption of broadcast content on user devices. These applications do not support multitasking while users watch their media content.

User devices are typically programmed to interrupt activities being performed, for example, streaming of a video or a live broadcast event, when an incoming call is received and is being responded to. In a typical communication environment, if a user gets an incoming call while performing an activity, for example, watching a video or a live broadcast event from a media content platform such as YouTube® of Google Inc., NETFLIX® of Netflix, Inc., dish NETWORK®, etc., streaming video, etc., on a user device, the incoming call interrupts and stops the activity to enable the user to respond to the incoming call, for example, to answer the call, reject the call, or send a message to the caller. After the user responds to the incoming call, the user has to restart the activity, for example, press a play button again to resume watching the video, and then wait for the video to reload, in order to continue watching the video from where the video had last stopped prior to receiving the incoming call. The same scenario applies when another call comes in after the user reloads the video, thereby interrupting the video again.

In a scenario of an incoming call being received, while a user performs an activity on a user device, for example, watching a video, the user may want to have substantive information about the incoming call without having to interrupt the playing of the video on the user device. Conventional methods notify a user about the incoming call by interrupting the video with notifications that provide limited details, for example, a phone number and a name of the caller if the name and the corresponding phone number are stored in the user device. Moreover, if an image of the caller is displayed, the video is interrupted and caller information is displayed in the place of the display of the video on a display screen of the user device. There is a need for notification methods that do not interrupt the performance of an activity, for example, playing of a video, by displaying notifications of the incoming calls in a non-intrusive manner.

Furthermore, there is a need for generating notifications that provide substantive information about the incoming call, for example, by providing a subtle indication of an incoming call through a vibration of the user device with optional caller identification details and call management options on receiving a user input, through a record of prior voice and data communication on the user device, etc., while continuing playing of the video. Furthermore, there is a need for the substantive information to be displayed as an overlay on the video being played in a non-intrusive manner, for example, as a translucent display on a part of the display screen on the user device or as a hidden display that is activated by a user input on the display screen, so that the displayed video is still visible in its entirety to the user. Moreover, different users typically have different requirements or preferences for non-intrusive notifications. Therefore, there is a need for a user to be able to configure the notifications, for example, to display only a phone number and an image of the caller in a compact and aesthetic display object, or to display an identification of the caller in a display object with an option to expand the display object to show a record of prior voice and data communication on the user device, or to only provide a subtle indication, for example, a vibration of the user device and display caller identification and other details only on request by the user through a subsequent user interaction with the user device. Furthermore, for uninterrupted playing of a video on the user device, there is a need for allowing a user to configure a text only mode on the user device for managing an incoming call from a caller during the playing of the video on the user device, where the text only mode allows the caller to communicate with the user only through text messages for the duration of the playing of the video.

Furthermore, conventional methods do not allow a user watching a video to communicate with a caller of an incoming call through messages, for example, text messages, by converting an incoming call into a messaging session, while watching the video and listening to an audio component of the video. There is a need for splitting a user interface on a display screen of a user device into more than one section to allow continued playing of the video on one section of the user interface, while allowing the user to send and receive text messages with the caller of the incoming call on another section of the user interface.

In another scenario, when a user is playing media, for example, audio content, video content, etc., on a user device and if an incoming call has to be attended to immediately by the user, there is a need for automatically recording the media that is playing on the user device and storing the recorded media on the user device or a cloud computing environment that would allow the user to resume consumption of the media from the point in time when the incoming call occurred.

Hence, there is a long felt but unresolved need for a method and an electronic device that simultaneously manage an incoming call during performance of an activity, for example, playing of media such as a video on the electronic device by a user, without interrupting the playing of the media on the electronic device. Moreover, there is a need for a method and an electronic device that generates non-intrusive notification objects with detailed information in different configurable formats based on user preferences to notify the user about the incoming call without interrupting the playing of the media on the electronic device. Furthermore, there is a need for a method and an electronic device that allows a user to configure a text only mode on the user device for managing an incoming call from a caller during the playing of the media on the user device, where the text only mode allows the caller to communicate with the user only through text messages for the duration of the playing of the media. Furthermore, there is a need for a method and an electronic device that allow the user to communicate with a sender of the incoming call, that is, a caller through text messages or social media while continuing the playing of the media uninterrupted on separate sections of a display screen of the electronic device. Furthermore, there is a need for a method and an electronic device that handle audio of an incoming call without interrupting any video component of the media being played on the electronic device, for example, by continuing display of the video component while muting the audio component of the media being played for a duration of the incoming call. Furthermore, there is a need for a method and an electronic device that automatically record any media being played on the electronic device and/or in a cloud computing environment when the user chooses to accept an incoming call.

SUMMARY OF THE INVENTION

This summary is provided to introduce a selection of concepts in a simplified form that are further disclosed in the detailed description of the invention, and is not intended to determine the scope of the claimed subject matter.

The method and the electronic device disclosed herein address the above mentioned need for simultaneously managing an incoming call while playing media on the electronic device, without interrupting the playing of the media on the electronic device. Moreover, the method and the electronic device disclosed herein generate non-intrusive notification objects with detailed information in different configurable formats based on user preferences to notify the user about the incoming call without interrupting the playing of the media on the electronic device. Furthermore, the method and the electronic device disclosed herein allow a user to configure a text only mode on the user device for managing an incoming call from a caller during the playing of the media on the user device, where the text only mode allows the caller to communicate with the user only through text messages for the duration of the playing of the media. Furthermore, the method and the electronic device disclosed herein allow the user to communicate with a sender of the incoming call, that is, a caller through text messages or social media while continuing the playing of the media, uninterrupted, on separate sections of a display screen of the electronic device. Furthermore, the method and the electronic device disclosed herein handle audio of an incoming call without interrupting any video component of the media being played on the electronic device, for example, by continuing display of the video component while muting the audio component of the media being played for a duration of the incoming call. Furthermore, the method and the electronic device disclosed herein automatically record any media being played on the electronic device and/or in a cloud computing environment when the user chooses to accept an incoming call.

The method and the electronic device disclosed herein employ an uninterrupted media play and call management system (UMPCMS) executable by at least one processor configured to execute computer program instructions for managing an incoming call during playing of media on the electronic device, hereinafter referred to as a "user device", without interrupting the playing of the media on the user device. The UMPCMS receives an indication of the incoming call during the playing of the media on the user device via a graphical user interface (GUI) provided by the UMPCMS on the user device. The UMPCMS generates a notification object, for example, a stamp object, a calendar object, a blinder object, etc., with one or more call management options for the incoming call in one of multiple configurable formats based on preconfigured criteria. The UMPCMS overlays the generated notification object with one or more call management options on the GUI, while supporting continued playing of the media on the user device via the GUI without interruption by the incoming call. The UMPCMS receives a selection of one of the call management options through the overlaid notification object from the user device via the GUI and processes the received selection of the call management option. The UMPCMS performs one or more executable actions on the incoming call and/or the media being played on the user device based on the processed selection of the call management option.

The method and the electronic device disclosed herein implement a call management program comprising a default notification system and a manual notification system that enhance a user's experience in watching media, for example, videos or a live broadcast by allowing continuous playing of videos or live broadcast content via the uninterrupted media play and call management system (UMPCMS) on the electronic device, with the ability to provide the user with a non-intrusive notification of an incoming call and the ability to respond or reply, for example, by a text message or social media to a caller of the incoming call. In the method disclosed herein, the UMPCMS notifies the user without the user having to leave a video application and having to tap a play button again to resume play of a video. Under a default setting, the UMPCMS provides the user with a text only mode option. For example, when the user is watching a video and receives an incoming call, the UMPCMS on the user's electronic device automatically sends the caller a text only mode response from the user's electronic device without interrupting the playing of the video on the user's electronic device. Moreover, the UMPCMS allows the user to watch, for example, about 1 to at least 3 videos or live events continuously on one electronic device while multitasking simultaneously, for example, while receiving a call notification, responding by a text message or social media, sending a text only mode response, recording on cloud audio, communicating through phone calls, video calls, etc., and allows the user to retrieve logs, for example, social media logs, text logs, television programming logs, electronic mail (email) logs, images, video logs, etc., by a calendar date on a calendar user interface of a calendar object.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Disclosed herein is a method and an uninterrupted media play and call management system (UMPCMS) for managing an incoming call during playing of media on an electronic device, hereinafter referred to as a "user device", without interrupting the playing of the media on the user device. As used herein, "media" refers to content in different combined and individual formats, for example, audio, video, audiovisual, animations, and rich content formats. The media for viewing is obtained from media content platforms, for example, as streaming content, live broadcast content, downloaded content, stored content, etc., and comprises content on demand. The media comprises, for example, audio content, video content, music content such as an online song, gaming content, etc., and any combination thereof. The UMPCMS renders non-intrusive default notifications based on preconfigured criteria, and manual notifications based on options selected by a user of the user device while playing the media on the user device. The method disclosed herein enhances a user's video viewing experience or broadcasting network experience by allowing continuous playing of media, for example, videos or live broadcast content in an application on a user device with an ability to give a user a non-intrusive notification of the incoming call and the ability to respond or reply to a caller of the incoming call, for example, by text or social media. The UMPCMS notifies the user of the incoming call without stopping the playing of the media and without the user having to leave the video application and having to select a play option again to resume playing of the media. The UMPCMS provides the user with a text only mode option that can be set as one of the preconfigured criteria. For example, when the user receives an incoming call while watching a video, the UMPCMS automatically notifies the caller that the user is available for only text communication and sends the caller a text only mode response.

Figure 1:
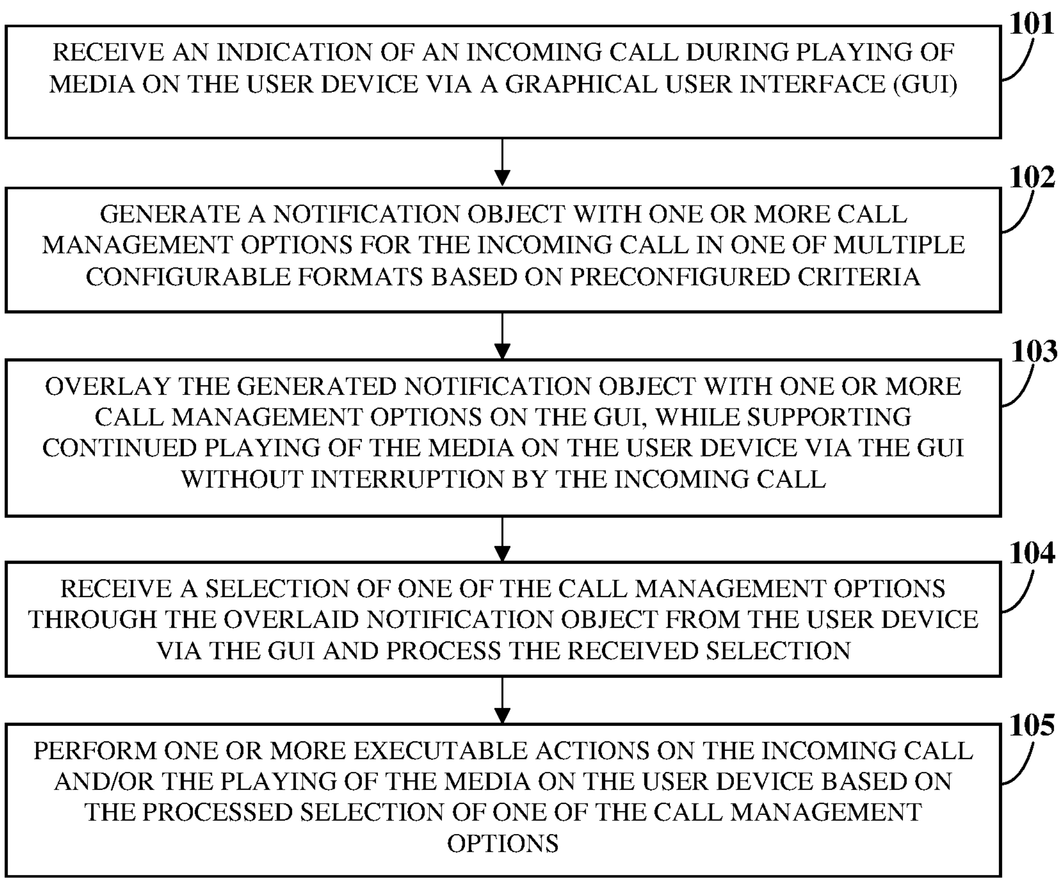
FIG. 1 illustrates a method for managing an incoming call during playing of media on a user device, without interrupting the playing of the media on the user device.

Moreover, the uninterrupted media play and call management system (UMPCMS) allows the user to experience the ability to watch, for example, up to at least a predetermined number of videos or live events continuously while multitasking simultaneously, for example, to respond to a received call notification, for example, by text or social media, to enable the text only mode, to record an audio component of the videos or live events on the user device or in a cloud computing environment and to retrieve a log of activities, for example, social media logs, text message logs, television programming logs, electronic mail (email) logs, image logs, video logs, etc., from a calendar date using a calendar user interface of a calendar object as disclosed in the detailed description of FIG. 1. As used herein, "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of the configurable computing physical and logical resources.

Furthermore, the UMPCMS allows the user to watch up to a predetermined number of live events, for example, at least three live events on the user device and communicate with users of other user devices, for example, through social media, text messaging, a voice call, a video call, etc., using multiple interface sections on a display screen of the user device. For example, when watching three videos simultaneously and communicating with a user of another user device, the UMPCMS renders an audio component of a live event displayed in a first interface section near the top of the display screen of the user device along with a video component. In this example, the UMPCMS renders only a video component of two live events that are displayed in interface sections immediately below the first interface section, with the communication with the user of the other user device occupying an interface section near the bottom of the display screen of the user device. In another example, when the user watches three live events on a display screen of the user device, the UMPCMS allows the user to hear the audio component of a live event in a first interface section on the top of the display screen, watch another live event on a second interface section below the first interface section, and view another live event and send text messages to another user through a third interface section below the second interface section.

In accordance with the method and the uninterrupted media play and call management system (UMPCMS) disclosed herein, a user will experience a call management system that simultaneously controls uninterrupted activity and event management. The method disclosed herein provides a method for watching multiple media on multiple layers or interface sections on one display screen of a user device, for example, a smartphone while simultaneously receiving a call, responding to a caller, for example, by text or social media, recording live broadcasts on cloud storage, and accessing a calendar object for organizing and recording all activities. The method disclosed herein can be implemented on any video or broadcasting or live streaming application to control phone call interruptions while watching a video continuously and allowing the user to respond by text or social media. The user receives an incoming call on a user device, for example, a smartphone from a radio frequency (RF) wireless tower or through a network that implements Wi-Fi® of Wi-Fi Alliance Corporation. The network enabled user device that hosts the UMPCMS is connected to a server that has application programming interface (API) support or World Wide Web support to view a video or broadcasting content on the user device. Moreover, the UMPCMS allows the user to share, for example, broadcasting channels, photos, videos, and post or rate whether they like or hate media to friends, persons referred to as backstabbers in a social networking environment, etc. The UMPCMS tracks activities and categories mentioned above in a calendar object per date and category.

FIG. 1 illustrates a method for managing an incoming call during playing of media on a user device, without interrupting the playing of the media on the user device. The method disclosed herein employs the uninterrupted media play and call management system (UMPCMS) executable by at least one processor configured to execute computer program instructions for managing an incoming call during playing of the media on the user device, without interrupting the playing of the media on the user device. In an embodiment, the UMPCMS comprises a software application downloadable and usable on the user device. In another embodiment, the UMPCMS is implemented as a web based platform, for example, a website hosted on a server or a network of servers accessible by the user device via a network, for example, the internet, a wireless network, a mobile telecommunication network, etc. In another embodiment, the UMPCMS is implemented in a cloud computing environment and provides an open communication community service. In an embodiment, the UMPCMS is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. In an embodiment, the UMPCMS is configured as a cloud computing based platform implemented as a service for managing an incoming call during playing of media on a user device, without interrupting the playing of the media on the user device. Furthermore, in an embodiment, the UMPCMS allows the user to schedule recordings of prescheduled media broadcasts in the cloud computing environment for later viewing.

In an embodiment, the uninterrupted media play and call management system (UMPCMS) provides access to streaming media on the user device via a graphical user interface (GUI) provided by the UMPCMS and rendered on a display screen of the user device through applications installed on the user device and media content platforms, for example, YouTube® of Google Inc., SoundCloud® of SoundCloud Ltd., NETFLIX® of Netflix, Inc., Chromecast™ of Google Inc., Livestream® of Livestream LLC, the dish NETWORK® of Dish Network, LLC, etc. In an embodiment, the UMPCMS allows the user to perform social networking activities while viewing live broadcasts and streaming media via the GUI through an in-built social media application and also through third party applications, for example, blogs such as micro-blogging and presence applications comprising, for example, Twitter® of Twitter, Inc., Tumblr® of Tumblr, Inc., social networking websites such as Bebo® of Bebo, Inc., Facebook® of Facebook, Inc., Linkedin® of Linkedin Corporation, MySpace® of MySpace Inc., etc. Media, for example, videos, can be played on the user device in the form of streaming videos, live video broadcasts, playing videos stored in the user device, etc., via the GUI provided by the UMPCMS. Social networking comprises engaging with users of other user devices through conversations about the media and formation of groups, following of the activities within the in-built application of the users of the other user devices, etc.

In an embodiment, the uninterrupted media play and call management system (UMPCMS) reversibly configures the graphical user interface (GUI) into multiple interface sections for playing up to a predetermined number of media simultaneously. The UMPCMS reverses the configuration of the GUI into multiple interface sections on receiving a selection of an option from the user device via the GUI. For example, the UMPCMS configures the GUI into three interface sections to allow a user to watch up to three live video broadcasts on the three interface sections of the GUI. When the user selects an option on the GUI to view one of the three live video broadcasts, the UMPCMS configures the GUI to display the selected live video broadcast on the entire GUI. The GUI provides access to media along with a list of options associated with the media. In addition to playing the media via the GUIon the user device, the user can rate the quality of the media being streamed, share the media being streamed with other user devices, communicate with the other user devices concurrently, etc. A user may be playing media on the user device via the GUI when an incoming call is received.

When a caller places a call to a recipient, herein referred to as the "user", the uninterrupted media play and call management system (UMPCMS) receives 101 an indication of the incoming call during the playing of the media on the user device via the graphical user interface (GUI). As used herein, the term "caller" refers to an individual or an entity who communicates or attempts to communicate with a recipient, for example, by placing a call, sending a text message, sending an electronic mail (email), sharing media, sharing data, etc., with the recipient. Also, as used herein, "data" refers to information that is generated, stored, or transmitted in a digital format by a processor capable of executing computer program instructions to process the information. Also, as used herein, the term "recipient" refers to the user who receives or is intended to receive the communication originated by the caller. The user device communicates with a base station having an antenna via a communication network through radio frequency communication for receiving communication facilities provided by the base station over an area. When a caller sends a communication, for example, attempts to originate a call from the caller's user device, the caller's user device transmits the intent to send the communication through specific radio frequency signals over predefined channels of communication to the base station, which allocates radio frequencies to be used for the communication and notifies the caller's user device. The caller's user device then transmits the communication to the base station. The base station comprises an electronic telephone exchange that identifies the recipient of the communication from the caller's user device and transmits an intent of the communication to the recipient's user device along with identifiers of the caller. The identifiers of the caller are established with the communication network by the caller's user device or looked up by the communication network from databases during the communication between the caller's user device and the base station. The identifiers comprise, for example, a phone number and an area where the phone number was registered with the communication network.

The recipient's user device receives the intent of communication along with the identifiers of the caller from the communication network through an antenna configured on the recipient's user device in the form of radio frequency signals of a specific frequency. A radio frequency unit on the recipient's user device processes the received intent of communication to be accessible to an operating system on the user device. The uninterrupted media play and call management system (UMPCMS) on the recipient's user device that is in operable communication with the operating system of the user device obtains the intent of communication from the operating system as an indication of an incoming call. The UMPCMS then communicates with the operating system on the user device to access a database in a memory unit of the user device or an external database available through other communication networks, for example, a second preconfigured communication network or the internet, to obtain further details, if any, of the caller based on the identifiers received from the communication network. The uninterrupted media play and call management system (UMPCMS) receives the indication of an incoming call from the operating system on the user device by obtaining permissions for the reception of the incoming call from the operating system.

The recipient's user device receives the intent of communication along with the identifiers of the caller from the communication network through an antenna configured on the recipient's user device in the form of radio frequency signals of a specific frequency. A radio frequency unit on the recipient's user device processes the received intent of communication to be accessible to an operating system on the user device. The uninterrupted media play and call management system (UMPCMS) on the recipient's user device that is in operable communication with the operating system of the user device obtains the intent of communication from the operating system as an indication of an incoming call. The UMPCMS then communicates with the operating system on the user device to access a database in a memory unit of the user device or an external database available through other communication networks, for example, a second preconfigured communication network or the internet, to obtain further details, if any, of the caller based on the identifiers received from the communication network. The uninterrupted media play and call management system (UMPCMS) receives the indication of an incoming call from the operating system on the user device by obtaining permissions for the reception of the incoming call from the operating system.

After receiving an indication of the incoming call during the playing of the media on the user device, the uninterrupted media play and call management system (UMPCMS) generates 102*a* notification object with one or more call management options for the incoming call in one of multiple configurable formats based on preconfigured criteria. As used herein, "notification object" refers to a software object that stores a state of a notification and displays descriptive content to notify a user about an incoming call and one or more call management options that a user can select to manage the incoming call. Also, as used herein, "configurable format" refers to a format for the notification object, for example, a decorative format such as a postage stamp format, a calendar format having calendar information displayed on an interactive calendar user interface, a blinder format that appears, for example, at the top of a display screen, with interface elements for the different call management options. As used herein, "blinder" refers to a banner that is displayed on receiving a user input from the user device or a user interaction with the user device, for example, when the user performs a pull down gesture using a finger or an input device from an upper end of the graphical user interface (GUI) of the UMPCMS on the user device. In an embodiment, the UMPCMS retrieves an image from the memory unit of the user device, or in another embodiment, accesses the communication network to obtain an image of the caller. In another embodiment, the UMPCMS retrieves an image and other social media information of the caller through social networking applications, if the caller is listed as a contact on the recipient's user device. The generated notification object comprises, for example, one or more identifiers of the caller of the incoming call. The identifiers comprise, for example, a name, a contact number, an image of the caller, social media information of the caller, etc. That is, the UMPCMS provides an identifier of the caller, for example, a name of the caller, a phone number of the caller, etc., in the notification object to be rendered on the GUI to allow the recipient to identify the caller while performing an activity, for example, playing media via the GUIon the user device.

In an embodiment, the uninterrupted media play and call management system (UMPCMS) allows a user, for example, the recipient, to configure the notification object in one of the configurable formats via the graphical user interface (GUI) of the UMPCMS. The preconfigured criteria for the generation of the notification object with the call management options comprise, for example, default notifications and are selected by a user of the user device to be a stamp notification, or a blinder notification, or a calendar notification and a text only mode, where the text only mode allows only text communication with the user device. If the recipient selects the text only mode as a default notification for managing an incoming call during the playing of media on the user device, the UMPCMS allows the caller to communicate with the recipient only through text messages for the duration of the playing of the media. The preconfigured criteria for the generation of the notification object with one or more call management options further comprise, for example, blocking the incoming call, accepting the incoming call while supporting the continued playing of the media on the user device via the GUI without interruption by the incoming call, vibrating the user device, etc. For example, a user may configure the UMPCMS to block all incoming calls to support uninterrupted playing of the media via the GUI of the UMPCMS. In this example, the UMPCMS generates a notification object that allows the user to automatically block the incoming call and send an automated message or notification to the caller of the incoming call instructing the caller to send a text message to the user as the user is watching a video and does not want to be interrupted. In another example, the UMPCMS provides the user with an option to allow only text communication to support, for example, uninterrupted consumption of media such as audio and video and communicate with prospective callers of incoming calls through text messages. In this example, the UMPCMS generates a notification object with a "text back" call management option to allow the user to send a text communication to a caller of the incoming call, without interrupting the play of media on the user device.

The notification object in a configurable format generated by the uninterrupted media play and call management system (UMPCMS) is, for example, a calendar object with an image of the caller, the name of the caller, and a time and a date of the incoming call, or a stamp object with an image of the caller, the name of the caller, a time and a date of the incoming call, or a blinder object. For purposes of illustration, the detailed description refers to the notification object being a stamp object, a calendar object, or a blinder object; however the scope of the method and the UMPCMS disclosed herein is not limited to the notification object being generated as a stamp object, a calendar object, or a blinder object, but may be extended to include generation of notification objects of other configurable formats. In an embodiment, the UMPCMS configures the blinder format as the default format for the notification object. The blinder object is hidden and only displayed on the graphical user interface (GUI) of the UMPCMS on receiving an input from the user, for example, when the user pulls down the blinder object from an upper end or top of the GUI of the UMPCMS on the user device. The blinder object is accompanied by a notification, for example, pulsing a color such as a red light or a green light of a light emitting diode (LED) on the user device or vibrating the user device, to indicate the availability of the blinder object for display on receiving the user input.

In an embodiment, the uninterrupted media play and call management system (UMPCMS) provides the user with options to configure the notification object via the graphical user interface (GUI), for example, to display only a phone number and an image of the caller in a compact and aesthetic stamp object, or to display an identification of the caller in a calendar object with an option to expand the calendar object to show a record of prior voice and data communication on the user device, or to only provide a subtle indication, for example, a vibration of the user device and display caller identification and other details only on request by the user through a subsequent interaction by the user with the user device. Therefore, the UMPCMS provides the user with options to select manual notifications to be one of a stamp notification, a blinder notification, a calendar notification, and a text only mode, wherein the text only mode allows only text communication with the user device. The UMPCMS configures the notification object according to the user's preferences, for example, by using methods instantiated from classes of the Java® programming language that allow configuring properties of the software based on operations during runtime of the software.

The call management options comprise, for example, accepting the incoming call, rejecting the incoming call, sending a text communication to a caller of the incoming call, sending a social media communication to a caller of the incoming call, sending an automated message indicating an unavailability of the user device for any communication for a duration of the playing of the media, sending an automated message indicating an availability of the user device only for the text communication for the duration of the playing of the media, and forwarding the incoming call to a predefined destination, for example, a predefined phone number. As used herein, "social media communication" refers to communication sent in the form of messages such as text messages, posts, images, videos, etc., via social networking platforms.

In an embodiment, the notification object in a configurable format comprises one or more interface elements for receiving a selection of one of the call management options from the user device via the graphical user interface (GUI). As used herein, "interface element" refers to any software implemented switch or button, for example, a touch button or a tactile button, a screen icon type touch button, a touch pad, swipable elements, etc., capable of receiving an input, for example, in the forms of clicks, presses, swipes, etc., from a user or capturing an application of pressure from the user. For example, the uninterrupted media play and call management system (UMPCMS) configures interface elements in the notification object, for example, in the form of swipable arrows that are displayed on the GUI on a touch enabled display screen of the user device for receiving a selection of one of the call management options from the user. The UMPCMS configures the swipable arrows for display on the GUI on the touch enabled display screen in different directions to allow selection of different call management options. For example, an upward swipe of a swipable arrow on the GUI on the touch enabled display screen allows a user to select an call management option to send a text communication to a caller of the incoming call, while a downward swipe on a swipable arrow on the GUI on the touch enabled display screen allows the user to select a call management option to send an automated message indicating an availability of the user device only for a text communication for the duration of the playing of the media. In another example, a right swipe of a swipable arrow on the GUI on the touch enabled display screen allows the user to select a call management option to accept the incoming call and a leftward swipe of a swipable arrow on the GUI on the touch enabled display screen allows a user to select a call management option to reject the incoming call.

In an embodiment, the uninterrupted media play and call management system (UMPCMS) generates a notification object with the call management options based on the preconfigured criteria set by the user of the user device and in a format configured by the user using software resources provided by the operating system of the user device, for example, telephony function modules and graphics generation modules. For example, the UMPCMS generates a notification object by utilizing drawing functions of a graphics generation module provided by the operating system on the user device. The UMPCMS defines object information comprising, for example, user interface elements such as icons, a title, actions, and the call management options using programming structures and classes of a builder object created, for example, using the Java® programming language. The UMPCMS then generates the notification object using the defined object information.

In an embodiment, the uninterrupted media play and call management system (UMPCMS) provides the user with a default setting for a text only mode, where only text communication is allowed with the user device, and a manual setting that allows a user to select from one of a predetermined number of call management options to receive an incoming call and respond continuously while watching a video. The UMPCMS generates different types of notification objects, that is, a stamp object, a pull down blinder object, a calendar object with a photo object and a text only mode object. For example, in a user device running the Android® operating system, when the UMPCMS is invoked on the user device and a media file is opened via the graphical user interface (GUI) of the UMPCMS, the operating system reads a file, for example, Android.Manifest.xml written in an extensible markup language (XML) format that defines functions and permissions of the UMPCMS, thereby executing all functions required by the UMPCMS on the user device. When the playing of media, for example, a video is detected in a video player of the UMPCMS on the user device and a notification is received from an external application programming interface (API), for example, a Caller API in the UMPCMS, the UMPCMS provides an option to add an image of the caller to the caller information comprising, for example, a contact name and a phone number, already existing in the user device. Therefore, when the caller places a call, the UMPCMS calls a stamp notification class to generate and render the stamp object on the GUI of the UMPCMS, thereby verifying the working of the stamp object. The UMPCMS calls a swipe class to render the pull down blinder object as a hidden option on the GUI, which can be viewed by a user interaction with the user device, for example, a swipe or pull down gesture when a user detects a vibration of the user device and/or views flashing light notifications in a rhythm of a phone ringer. On displaying the blinder object, the UMPCMS renders the call management options configured in the blinder object. When there are notifications from the external API, the UMPCMS assists the operating system of the user device to recognize and understand the notifications and operate accordingly. A generic computer using a generic program cannot generate a notification object with one or more call management options for the incoming call in one of multiple configurable formats based on preconfigured criteria in accordance with the method steps disclosed above.

The uninterrupted media play and call management system (UMPCMS) overlays 103 the generated notification object with one or more of the call management options on the graphical user interface (GUI), while supporting continued playing of the media on the user device via the GUI without interruption by the incoming call. In an embodiment, the UMPCMS overlays the generated notification object with the call management options on the GUI as a translucent display on a display screen of the user device, while supporting the continued playing of the media on the user device via the GUI without the interruption by the incoming call. By overlaying the generated notification object as a translucent display, the UMPCMS allows a user to view the entire display screen of the user device for watching media without interruption by the notification object. The UMPCMS allows the user to view a video component of the media being streamed that is rendered on the GUI in its entirety even when the notification object is overlaid on the GUI. The call management options rendered on the GUI do not interrupt or stop the activity being performed on the user device. The UMPCMS overlays the notification object with the call management options on the GUI of the user device by accessing hardware resources, for example, the display screen and a device vibration unit of the user device by communicating with the operating system which in turn communicates with underlying hardware resources of the user device through specific interface software. For example, in a user device with the Android® operating system, the UMPCMS overlays the generated notification object on the GUI as a translucent display using a computer program code implemented in the extensible markup language (XML), a markup language developed by the World Wide Web Consortium, as a layout on the layout of the media being played on the GUI.

In an embodiment, the uninterrupted media play and call management system (UMPCMS) overlays the generated notification object with the call management options on the graphical user interface (GUI) as a hidden display on the display screen of the user device to support the continued playing of the media on the user device via the GUI without the interruption by the incoming call. The processor in communication with the UMPCMS on the user device executes instructions defined in a file named, for example, styles.xml written in the extensible markup language (XML) format to overlay the generated notification object with the call management options on the GUI as a hidden display on the display screen of the user device. The UMPCMS activates the hidden display of the notification object on receiving a user input from the user to allow the media, for example, the video being played to be visible in its entirety to the user via the GUI. The UMPCMS overlays the notification object as a hidden display or a translucent display with one or more of the call management options, for example, by creating a frame with labels and buttons through variables using methods provided by programmed classes of the Java® programming language that allow configuration of the properties of the variables, thereby providing the notification object for display on the display screen of the user device through output functions.

In an embodiment, when the notification object with the call management options is generated as a blinder object, the uninterrupted media play and call management system (UMPCMS) overlays the notification object on the graphical user interface (GUI) as a hidden display on the display screen of the user device, for example, to support uninterrupted rendering of media, for example, a video on the display screen. The UMPCMS can render the blinder object at any location on the GUI on the display screen of the user device. The UMPCMS notifies the user of the overlaid notification object through a vibration of the user device, if the user device is configured to support vibration. The UMPCMS displays the blinder object on the GUI on receiving a user input from the user via the GUI, for example, a swipe downwards starting from a position at a top corner or an upper end of the GUI on the user device. The interface elements for selecting one of the call management options in the blinder object are represented by descriptive icons for different call management options. The user selects a call management option, for example, by touching one of the descriptive icons with a finger or any other input device capable of providing an input, for example, a tactile input. A generic computer using a generic program cannot overlay the generated notification object with one or more of the call management options on the GUI as a translucent display or a hidden display, while supporting continued playing of the media on the user device via the GUI without interruption by the incoming call.

When a user who is watching a video on the user device receives an incoming call by vibration and a blinder object configured, for example, as a hidden banner, the user has to pull the blinder object, for example, from an upper right corner to view who is calling. Once pulled down, the blinder object displays options to the user, for example, to (a) answer the incoming call by pausing the playing of the video, where live broadcasts are automatically recorded on the user device and/or in a cloud computing environment once the incoming call is answered, and where the uninterrupted media play and call management system (UMPCMS) allows the user to fast forward the recorded video after the call; (b) block the caller for a duration of the video being watched. The UMPCMS transmits an automated text message to the caller to notify the caller that the caller is blocked for the duration of the video being watched; (c) reject the call; and (d) use the text only mode, which can be enabled, for example, by pulling down the blinder object once playing of the video starts and tapping a text only mode icon displayed by the blinder object. When an incoming call is received in the text only mode, the UMPCMS blocks the incoming call and sends a text message created by the user that only text communication is allowed with the user device. Therefore, the caller will be blocked and will receive the text message that only text can be received at this time from the user.

The uninterrupted media play and call management system (UMPCMS) renders the generated notification object on the graphical user interface (GUI) without interrupting the performance of an activity, for example, playing of a video, by displaying the notification object in a non-intrusive manner. The notification objects generated by the UMPCMS provide substantive information about the incoming call, for example, by providing a subtle indication of an incoming call through a vibration of the user device with optional caller identification details on receiving a user input through an interface element of the notification object, provide a record of prior voice and data communication on the user device, etc., while supporting continued performance of an activity, for example, playing of the video on the user device.

In an embodiment, the uninterrupted media play and call management system (UMPCMS) does not block the incoming call, while the user continues with an activity, for example, viewing and listening to a video, but provides a silent notification of the incoming call from the caller on the graphical user interface (GUI). On viewing the notification object overlaid by the UMPCMS on the GUI, while watching the media being played, a user can select one of the call management options from the notification object overlaid on the GUI through the interface elements in the notification object to manage the incoming call. For example, a user swipes interface elements on a notification object overlaid on the GUI on a touch enabled display screen of the user device with a finger or any other input device capable of providing a tactile input on the notification object in different directions to select different call management options. For example, swiping upwards starting from a position on the overlaid notification object indicates a selection of the call management option, for example, to send a text communication to a sender of the incoming call, while swiping downwards starting from a position on the overlaid notification object indicates a selection of the call management option, for example, to send an automated message indicating an availability of the user device only for a text communication for the duration of playing of media on the user device. Swiping to the right starting from a position on the overlaid notification object indicates a selection of the call management option, for example, to accept the incoming call, while swiping to the left starting from a position on the overlaid notification object indicates a selection of the call management option, for example, to reject the incoming call.

When the user selects one of the call management options through the overlaid notification object on the graphical user interface (GUI), the uninterrupted media play and call management system (UMPCMS) receives 104 the selection of the call management option through the overlaid notification object from the user device via the GUI and processes the received selection of the call management option. The UMPCMS does not interrupt the activity performed by the user on the user device, for example, viewing of the video, while receiving a selection of any one of the rendered call management options. The data inputted by the user, for example, the input keystrokes, computer mouse clicks, presses, swipes, gestures, configuration of the notification object, selection of one of the call management options, etc., via the GUI is transformed, processed, and executed by an algorithm defined in the UMPCMS for allowing management of an incoming call during playing of media on the user device.

The uninterrupted media play and call management system (UMPCMS) subsequently performs 105 one or more executable actions on the incoming call and/or the playing of the media on the user device based on the processed selection of the call management option. The UMPCMS manages the incoming call along with uninterrupted playing of media based on the selected call management option. The UMPCMS performs one or more executable actions on the incoming call and/or the playing of the media on the user device based on the selected call management option by accessing hardware resources, for example, the radio frequency unit, the input device, the audio speakers, etc., of the user device through a communication with the operating system, which in turn communicates with underlying hardware resources of the user device through specific interface software. For example, if the user chooses to accept the incoming call, the UMPCMS accesses the radio frequency unit through the operating system for sending and receiving data of an ensuing communication between the user and the caller of the incoming call. Furthermore, if a video is being played on the GUI, the UMPCMS mutes audio content of the video playing on the GUI to enable the user and the caller to communicate with each other. The UMPCMS plays the muted video on the GUI during a conversation between the user and the caller. When the user and the caller complete the call, the UMPCMS unmutes the audio content and resumes playing the audio content of the video, to allow the user to resume viewing and listening of the video without interruption.

In an embodiment, the performance of the executable actions on the incoming call and/or the playing of the media on the user device by the uninterrupted media play and call management system (UMPCMS) comprises configuring the graphical user interface (GUI) into a configurable number of interface sections to allow a recipient of the incoming call to execute one of the call management options during the playing of the media on the user device. In this embodiment, the UMPCMS executes the selected call management option on one of the interface sections of the GUI and continues the playing of the media on the other interface sections of the GUI. Consider an example where a user is watching a video on the GUI on the display screen of the user device and receives an incoming call. The UMPCMS receives an indication of the incoming call and generates a notification object, for example, a stamp object in a stamp format comprising a name, a contact number, and an image of the caller along with call management options for managing the incoming call. The UMPCMS then overlays the generated stamp object on the GUI as translucent display without interrupting the playing of the video. In this example, if the user selects the call management option to send a text communication to a sender of the incoming call through an interface element of the overlaid stamp object, the UMPCMS configures or splits the GUI into a first interface section and a second interface section. The UMPCMS then allows the user to send the text communication on the second interface section while supporting continued playing of the video on the first interface section of the GUI. The UMPCMS therefore enables the recipient to view the video, for example, on the upper interface section of the GUI without any interruption and also enables the recipient to simultaneously send a text message to the caller on the lower interface section of the GUI. The UMPCMS configures the GUI into multiple interface sections, for example, by using a constructor method in the Java® programming language with functions for splitting panes and nesting split panes as arguments.

In the above example, the uninterrupted media play and call management system (UMPCMS) does not mute the audio component of the video when the user selects the call management option to split the graphical user interface (GUI) to continue viewing the video and simultaneously send a text message to the caller of the incoming call. The UMPCMS therefore allows users to play media simultaneously and continuously with no pause or interruption or delay on a live status and respond to the incoming call with the rendered call management options. The UMPCMS provides a smooth transition from playing media, for example, watching and listening to videos to answering an incoming call, for example, by live text, forwarding the incoming call, answering the incoming call, or rejecting the incoming call.

In another embodiment, the performance of the executable actions by the uninterrupted media play and call management system (UMPCMS) on the incoming call and/or the playing of the media on the user device comprises recording the media being played for later use in the user device and/or in a cloud computing environment for a duration of the incoming call. In an embodiment, the when the incoming call is accepted, the UMPCMS pauses the playing of the media and records the media being played for later use for a duration of the incoming call. For example, when the user selects the call management option to answer an incoming call, for example, a video call, while viewing a video on the user device, the UMPCMS allows the user to answer the video call while recording and storing the video content in the user device and/or in a cloud computing environment for the entire duration of the video call. After the video call ends, the UMPCMS renders an option to the user to resume viewing the video from a temporal position in the video of the user's choice. In an embodiment where the video content is stored in one or more databases in the cloud computing environment, the UMPCMS retrieves the stored video content from the databases via a network and allows the user to resume viewing the video from a temporal position in the video of the user's choice.

In another embodiment, when the media being played on the user device comprises an audio component and a video component and the user accepts an incoming call, the uninterrupted media play and call management system (UMPCMS) reversibly replaces the audio component of the media being played with audio of the incoming call, while rendering the video component of the media being played on the graphical user interface (GUI) for a duration of the incoming call. For example, when the user selects the call management option to answer an incoming call, while consuming media with an audio component and a video component on the user device, the UMPCMS replaces the audio component of the media with the audio of the incoming call while supporting continued playing of the video component of the media on the GUI for the duration of the incoming call. That is, the UMPCMS mutes the audio component of the media being played while the incoming call is in progress, and continues the playing of the video component. On completion of the incoming call, the UMPCMS resumes the audio component of the media on the user device. The UMPCMS mutes the audio component of the media for the duration of the incoming call, for example, by creating a publisher object in the Java® programming language and calling methods to publish only video and passing arguments to the called methods that indicate the status of the incoming call, so that the audio component of the media is restored to its volume prior to the incoming call, on completion of the incoming call. The UMPCMS preprograms this audio function so that once an incoming call is accepted by the user, the UMPCMS mutes the audio of the media being played or adjusts the volume of the media to a volume lower than the volume of the caller speaking. The UMPCMS mutes or adjusts the volume of the media by accessing hardware resources, for example, the audio speakers of the user device through a communication with the operating system, which in turn communicates with underlying hardware resources of the user device through specific interface software. For example, if the user chooses to accept the incoming call, the UMPCMS accesses the audio speakers through the operating system for muting or adjusting the volume of the media. A generic computer using a generic program cannot perform one or more executable actions on the incoming call and/or the playing of the media on the user device based on the processed selection of the call management option.

In an embodiment, the uninterrupted media play and call management system (UMPCMS) configures the calendar object to log the incoming call, the playing of the media on the user device, and the executable actions performed on the incoming call and/or the playing of the media on the user device. In an embodiment, the UMPCMS logs the playing of the media on the user device in the calendar object along with creating and scheduling user events and live broadcast events in the calendar object. The calendar object further logs data comprising, for example, messages communicated between users, recordings of the media in the user device and/or the cloud computing environment, ratings of quality of the media, images, and social media, and creates and schedules recording of the media and user events. The UMPCMS configures the calendar object, which logs multiple activities on the user device along with creating and scheduling user events, to also log the executable actions performed by the UMPCMS based on the received and processed selection of one of the call management options by the user of the user device. For example, the UMPCMS records text messages sent and received, records media consumed on the user device, calendar events, posts, images, missed calls, etc., in the calendar object for allowing the user to access information related to the incoming call, the activities performed on the user device, and the executable actions performed on the incoming call and/or the playing of the media on the user device through the calendar object. The calendar object renders a calendar user interface displaying all the events that occurred on the user device, for example, in a days column. When the user clicks a particular day on the calendar user interface, the calendar object renders a pop up window with information of the events that occurred on that date.

The uninterrupted media play and call management system (UMPCMS) generates the calendar object to store all activities and events that occur at a particular time and date. The calendar object is associated with a calendar application programming interface (API) that is connected to a server database which stores the activities and events according to time and date of occurrence. The calendar object records information of all activities and events on any particular date. When activities are performed on the user device, the UMPCMS stores corresponding entries in a local database and/or an external database and/or a server using JavaScript Object Notation (JSON) web services. When the user selects a date in the calendar user interface of the calendar object, the UMPCMS queries the local database and/or the external database to retrieve entries corresponding to the selected date. The UMPCMS transmits the selected date in a query to the local database and/or the external database and/or the server, retrieves the corresponding entries that match the selected date and the activities that were performed on the selected date, and displays the logs in the calendar user interface of the calendar object.

The calendar object comprises an icon that displays a current time and a date. The calendar object further comprises a log of all communication received by and originated from the user device, a log of a duration of each communication, and a log of missed communication attempts by users of other user devices. The calendar object logs communication comprising, for example, voice calls and text messages sent from or received by the user of the user device, messages sent by the user, messages received by the user, and media shared between the user and users of other devices via in-built applications and third party applications for social networking while viewing live broadcasts and streaming media. The missed communication attempts comprise, for example, communication attempts that are blocked for a duration of the streaming media to support uninterrupted consumption of the media or missed otherwise, and corresponding voice mail messages left by a sender of a missed call. The calendar object further logs and stores a log of images captured through imaging activities on the user device, a log of images and other media sent to and received from users of other user devices by the user of the user device, and a schedule of recording of media associated with the activities on the user device in the user device and/or the cloud computing environment. On receiving a selection of an option from the user via the graphical user interface (GUI), the uninterrupted activity and event management system (UMPCMS) displays via the GUI, the calendar object with the aforementioned logs and the created and scheduled user events.

In the method disclosed herein, the design and flow of interactions between the uninterrupted media play and call management system (UMPCMS) with the user device is deliberate, designed, and directed. Every prompt, notification object, etc., the user receives via the graphical user interface (GUI) provided by the UMPCMS is configured by the UMPCMS to steer the user towards a finite set of predictable outcomes. The UMPCMS implements one or more specific computer programs to direct the user towards a set of end results. The interactions designed by the UMPCMS allow the UMPCMS to receive the configurations for the notification object, the selection of the call management options, etc., from the user, and from this information, through the use of other, separate and autonomous computer programs, manage the incoming call during playing of media on the user device. To record the configuration for the notification object, the user's selection of the call management options, the media played by the user on the user device, etc., generate and render the notification object on the GUI, and perform executable actions on the incoming call and/or the playing of the media on the user device based on the selection of the call management options requires no less than three separate computer programs, and cannot be easily nor manually executed by a person working with a generic computer.

The method disclosed herein effects an improvement in the field of mobile computing and data streaming. Current user devices are used for a plethora of applications, for example, playing media such as videos, live broadcasts, etc. The method disclosed herein addresses a specific requirement for managing incoming calls without interrupting playing of media on a user device. Since conventional and routine methods that manage incoming calls assign a higher preference to an incoming call when media is being played on the user device, the media being played is interrupted, to allow a user of the user device to respond to the incoming call. Though some conventional methods remember the temporal position at which streaming media is paused, these methods forego the already buffered portion of the streaming media, requiring the user to download that portion of the streaming media again. The method disclosed herein prevents redundant usage of network and user device resources, for example, network bandwidth, data, and user device processing, by managing incoming calls without interrupting media being played. As such the method disclosed herein is aimed at solving a specific problem to provide a solution to a long felt need that is hitherto not catered to by conventional methods.

Furthermore, the method disclosed herein improves the functioning of the user device by integrating with the basic functionality of the user device, through access to underlying hardware resources of the user device. In the method disclosed herein, the uninterrupted media play and call management system (UMPCMS) configured on the user device communicates with the operating system of the user device to access the display screen of the user device on which the graphical user interface (GUI) is implemented to make optimal use of the display screen by configuring the GUI into interface sections for allowing playing of multiple media up to a predetermined number of media and also communicating with users of other user devices without interrupting the media. The UMPCMS disclosed herein also accesses a splitter for audio, speakers, and the network interface in the user device to control audio of the media being played during an incoming call, thereby allowing a video of media streaming through the network interface to continue uninterrupted. By obviating the need to buffer unconsumed parts of streaming media multiple times due to interruption by incoming calls, the method disclosed herein improves efficiency of streaming through the network interface and reduces wear of the hardware resources, for example, a power source such as a battery, the network interface, the display screen, and the processor of the user device.

Furthermore, the method and the electronic device disclosed herein transform data to effect a solution for managing incoming calls without interrupting playing of media on a user device. The method and the electronic device disclosed herein receive inputs from a user through user interactions with the user device for configuring the uninterrupted media play and call management system (UMPCMS), configuring the notification objects, selecting call management options, and accessing activities on the user device, for example, playing videos and live broadcasts. In an embodiment, voice commands are received by the UMPCMS from the user of the user device. The inputs for configuring the UMPCMS and the notification objects, selecting call management options, etc., are transformed into executable actions that manipulate data of the media being played and the incoming call. When the user selects a call management option to communicate with a caller of the incoming call through a text communication instead of a voice call, the UMPCMS transforms video data of the media being played to fit dimensions of an interface section that is configured by the UMPCMS by splitting the graphical user interface based on user inputs. Furthermore, the UMPCMS transforms the data of the incoming call comprising, for example, identity information of the caller of the incoming call to be used for a text communication between the user and the caller. Furthermore, when the user accepts the incoming call, the UMPCMS transforms the audio data of the media being played, for example, by controlling volume of the audio data to allow the user to communicate with a caller of the incoming call.

In the method for managing an incoming call during playing of media on a user device, without interrupting the playing of the media on the user device disclosed herein, the uninterrupted media play and call management system (UMPCMS) does not prioritize the incoming call against the playing of the media as in conventional methods and systems, thereby allowing a user of the user device to continue playing of the media when the incoming call is received. When media is being streamed by the user from a network, for example, the internet, on the user device, the UMPCMS prevents redundant usage of network bandwidth and data, reducing costs incurred, processing power, and load on the network. While media is playing on the user device, the UMPCMS receives an indication of the incoming call, generates a notification object with one or more call management options based on preconfigured criteria set by the user, and overlays the notification object in a non-intrusive manner on the media being played through a translucent display and/or vibration of the user device without interrupting the playing of the media. The UMPCMS then performs executable actions on the playing of the media and/or the incoming call based on a call management option selected by the user, without interrupting the playing of the media. The executable actions on the playing of the media comprise, for example, recording the media being played in the user device and/or in a cloud computing environment, configuring the graphical user interface (GUI) of the UMPCMS into multiple interface sections for continued playing of the media on at least one of the interface sections, estimating a duration of the media being played, and controlling an audio component of the media being played. The executable actions on the incoming call comprise, for example, blocking the incoming call or allowing only text communication for the duration of the media being played, allowing the user to answer the call, reject the call, or forward the call to a predetermined destination, and allowing communication through text or social media on an interface section of the GUI, without interrupting the media being played. The above steps performed by the UMPCMS to manage the incoming call without interrupting the playing of the media on the user device are tangible, provide useful results, and are not abstract.

Figure 2:
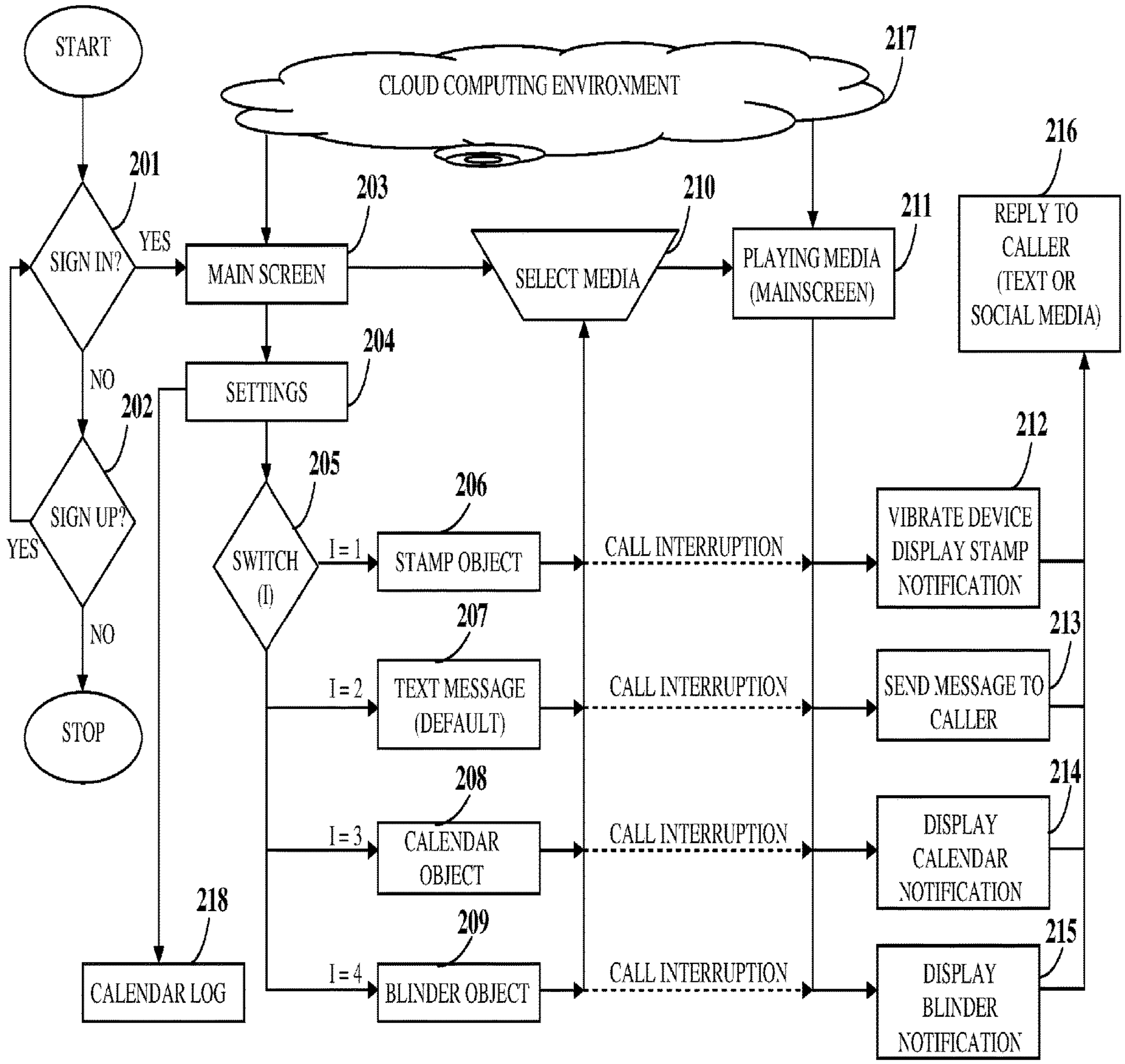
FIG. 2 exemplarily illustrates a flowchart comprising the steps performed by an uninterrupted media play and call management system for managing an incoming call through notification objects during playing of media on a user device, without interrupting the playing of the media on the user device.

FIG. 2 exemplarily illustrates a flowchart comprising the steps performed by the uninterrupted media play and call management system (UMPCMS) for managing an incoming call through notification objects during playing of media on a user device, without interrupting the playing of the media on the user device. The UMPCMS provides a sign in interface on the graphical user interface (GUI) to allow a user to sign into 201 and access the UMPCMS on the user device. The UMPCMS receives user credentials from the user through the sign in interface and authenticates the user to allow the user access to the UMPCMS. The UMPCMS also provides a sign up interface on the GUI to allow the user to sign up 202 or register with the UMPCMS. If the user is not registered with the UMPCMS, the UMPCMS receives registration information from the user and allows the user to set up user credentials through the sign up interface on the GUI. After being authenticated by the UMPCMS, the user is allowed to access the UMPCMS with the set up user credentials through the sign in interface on the GUI.

The uninterrupted media play and call management system (UMPCMS) displays a main screen 203 on the graphical user interface (GUI). The main screen 203 displayed on the GUI by the UMPCMS allows the user to configure settings 204 via a settings interface. The UMPCMS provides 205*a* software switch, for example, I, with predetermined values that can be selected by the user for configuring notification objects for incoming calls. The notification objects that can be configured in the UMPCMS are as disclosed in the detailed description of FIG. 1. When the UMPCMS receives a selection of a value 1 for the software switch, I, from the user via the GUI, the UMPCMS is configured to generate and render a stamp object 206 for indicating and managing the incoming calls. Similarly, when the UMPCMS receives a selection of a value 2, a value 3, or a value 4 for the software switch, I, from the user via the GUI, the UMPCMS is configured to configure a text message 207 based on user input, generate and display a calendar object 208, or generate and display a blinder object 209 respectively, for indicating and managing the incoming calls. The configuration of the UMPCMS through the settings interface by the user is optional, as the UMPCMS has a default configuration. In an embodiment, by default, the UMPCMS is configured to manage the incoming calls using the text message 207. Moreover, if the user wants to configure the UMPCMS, the configuration needs to be done once, and for subsequent accesses of the UMPCMS, the UMPCMS remembers the configuration unless the user changes the configuration of the UMPCMS.

The uninterrupted media play and call management system (UMPCMS) allows the user to select 210 media for viewing through applications installed on the user device and media content platforms as disclosed in the detailed description of FIG. 1, from the main screen 203 displayed on the graphical user interface (GUI) provided by the UMPCMS. The UMPCMS plays 211 the media selected by the user on the main screen 203 displayed on the GUI. When there is an incoming call, the UMPCMS generates notification objects with one or more multiple call management options for the incoming call based on preconfigured criteria and the configuration of the UMPCMS set by the user as disclosed in the detailed description of FIG. 1. As exemplarily illustrated in FIG. 2, if the UMPCMS is configured to display a stamp object 206 by a selection of a value 1 for the software switch, I, from the user, the UMPCMS vibrates the user device and displays a stamp notification 212 using the stamp object 206. Similarly, if the UMPCMS is configured to configure a text message 207, display a calendar object 208, or display a blinder object 209 by a selection of the corresponding values of 2, 3, or 4 for the software switch, I, from the user, the UMPCMS sends the configured text message 213 to a caller of the incoming call, displays a calendar notification 214 using the calendar object 208, or displays a blinder notification 215 using the blinder object 209 respectively. The UMPCMS allows the user to reply 216 to the caller of the incoming call through a text communication or a social media communication when the user selects a call management option for replying to the caller of the incoming call through the text communication or the social media communication. The UMPCMS renders the call management options for selection with the notification objects as disclosed in the detailed description of FIG. 1.

The uninterrupted media play and call management system (UMPCMS) on the user device communicates with a cloud computing environment 217 from the main screen 203 of the graphical user interface (GUI) to access media recorded and stored in the cloud computing environment 217. When playing 211 media on the main screen 203 of the GUI, the UMPCMS allows the user to record the media being played in the cloud computing environment 217 for later consumption by the user. In an embodiment, the UMPCMS records the media being played in the cloud computing environment 217 automatically when the user accepts an incoming call. When the UMPCMS displays the main screen 203 after receiving valid user credentials from the user through the sign in interface on the GUI, the UMPCMS allows the user to access media that is recorded in the cloud computing environment 217. During configuration of the UMPCMS by the user through the settings interface on the GUI, the UMPCMS provides access to a calendar log 218 through the calendar object 208. The calendar log 218 is configured by the UMPCMS to log the incoming call, the playing 211 of the media on the user device, and executable actions performed on the incoming call and/or the playing 211 of the media on the user device as disclosed in the detailed description of FIG. 1.

Figure 3A:
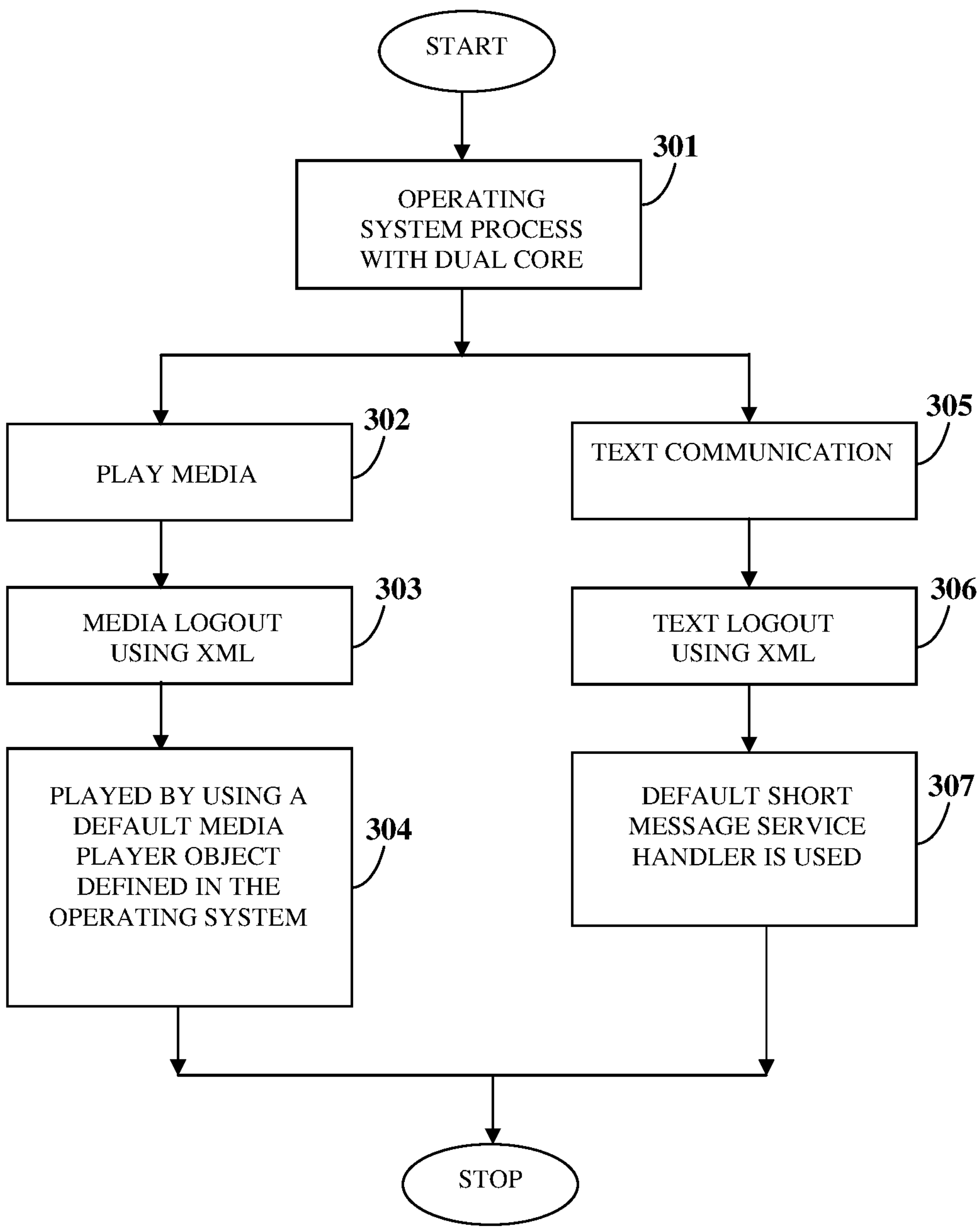
FIG. 3A exemplarily illustrates a flowchart for accessing media and text communication through the uninterrupted media play and call management system from an operating system on a user device.

FIG. 3A exemplarily illustrates a flowchart for accessing media and text communication through the uninterrupted media play and call management system (UMPCMS) from an operating system, for example, the Android® operating system on a user device. The operating system on the user device implements an associated operating system process 301 that is executed by a dual core processor configured to execute computer program instructions on the user device. The UMPCMS plays media 302 through a media logout process 303, for example, using the extensible markup language (XML). The UMPCMS allows the media to be played 304, for example, by using a default media player object defined by the operating system of the user device. The UMPCMS also implements text communication 305 through a text logout process 306, for example, using XML. For the text communication, the UMPCMS uses 307*a* default short message service (SMS) handler defined by the operating system of the user device.

Figure 3B:
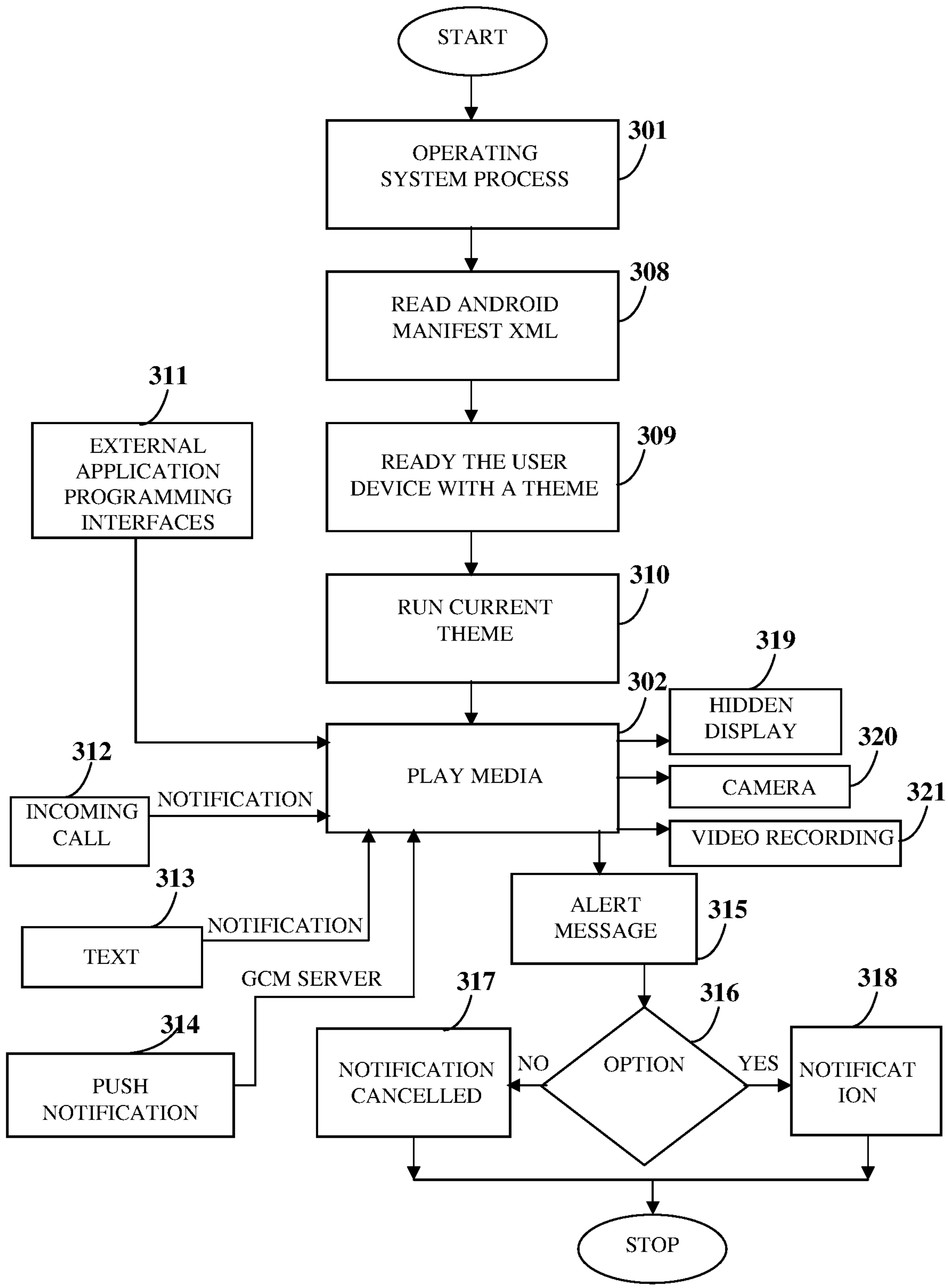
FIG. 3B exemplarily illustrates a flowchart comprising the steps performed by the uninterrupted media play and call management system for generating notification objects during playing of media on a user device for an incoming call, an incoming text communication, and a push notification based on preconfigured criteria.

FIG. 3B exemplarily illustrates a flowchart comprising the steps performed by the uninterrupted media play and call management system (UMPCMS) for generating notification objects during playing of media on a user device for an incoming call 312, an incoming text communication 313, and a push notification 314 based on preconfigured criteria. An operating system, for example, the Android® operating system on the user device implements an associated operating system process 301 that is executed by at least one processor configured to execute computer program instructions on the user device. When the UMPCMS is invoked on the user device, the operating system of the user device reads 308 an extensible markup language (XML) data file, for example, an Android.Manifest.xml. The Android.Manifest.xml data file presents information about the uninterrupted media play and call management system (UMPCMS) to the operating system required for running the software of the UMPCMS on the user device. The operating system readies 309 the user device with a preconfigured theme on the user device. The operating system then runs 310 the preconfigured theme on the user device.

The uninterrupted media play and call management system (UMPCMS) plays media 302 using external application programming interfaces (APIs) 311 on the graphical user interface (GUI) provided by the UMPCMS. Media content platforms, for example, YouTube of Google Inc., NETFLIX of Netflix, Inc., Chromecast of Google Inc., Livestream® of Livestream LLC, etc., provide the external APIs 311. In an embodiment exemplarily illustrated in FIG. 3B, on receiving an incoming call 312, a text communication 313, or a push notification 314 from a server, for example, the Google® Cloud Messaging (GCM) server, while the media is being played on the user device, the UMPCMS generates an alert message 315 or a notification object, for example, a blinder object configured as a hidden display 319 based on a configuration of the UMPCMS set by a user of the user device. If the user is capturing an image with a camera 320 on the user device or is performing a video recording 321 on the user device when the incoming call 312 is received, the UMPCMS sends an automated message to a caller of the incoming call 312 indicating the user will call back the caller of the incoming call 312 after capturing the image using the camera 320 or completing the video recording 321. The UMPCMS checks options 316 based on preconfigured criteria for generating a notification 318 or canceling generation of a notification 317. The UMPCMS generates the hidden display 319 or the alert message 315 and a subsequent notification without interrupting the media being played on the user device.

Figure 3C:
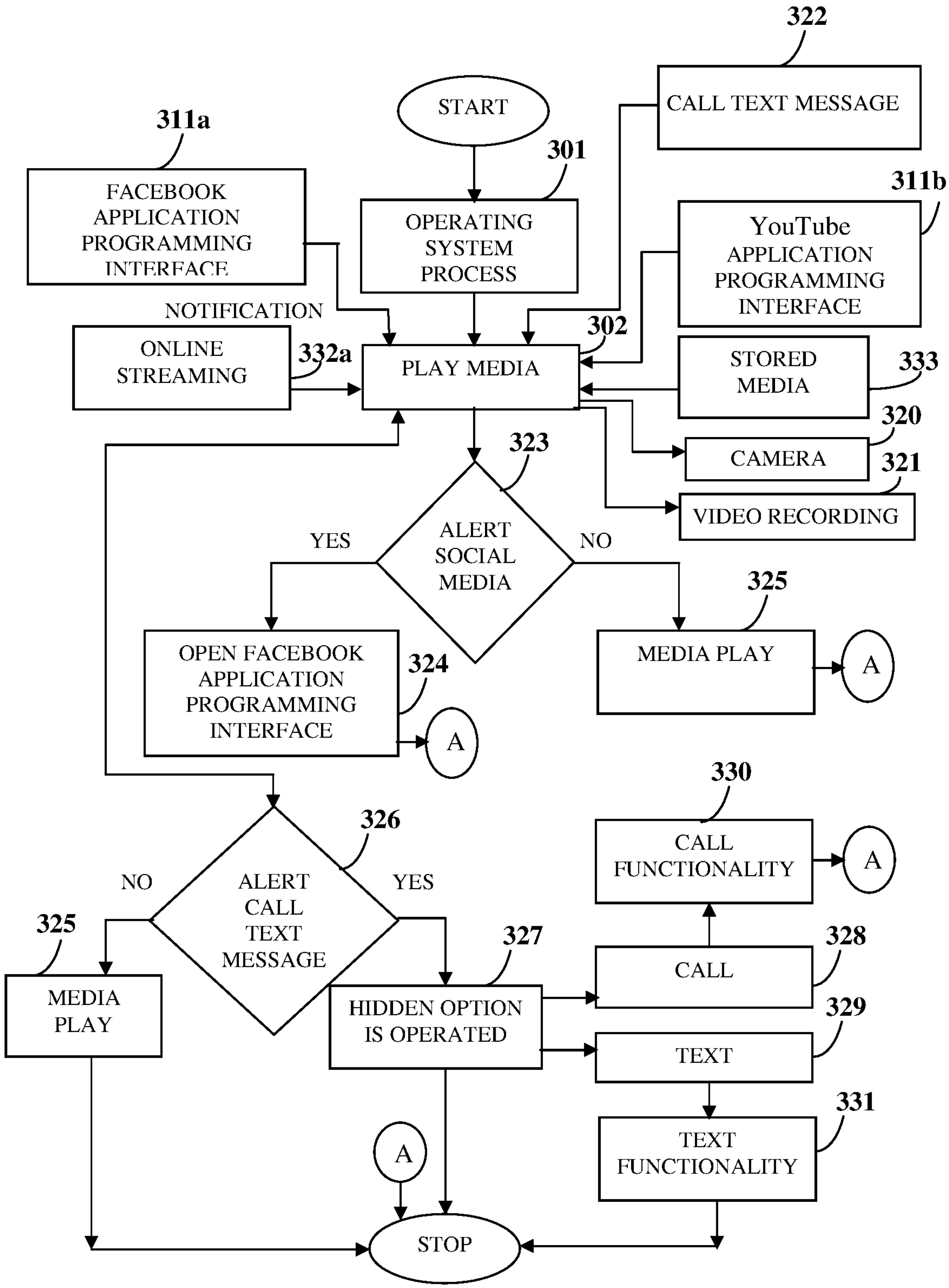
FIG. 3C exemplarily illustrates a flowchart comprising the steps performed by the uninterrupted media play and call management system for rendering the generated notification objects with call management options while supporting continued playing of media on a user device without interruption by an incoming call.

FIG. 3C exemplarily illustrates a flowchart comprising the steps performed by the uninterrupted media play and call management system (UMPCMS) for rendering the generated notification objects with call management options while supporting continued playing of media on a user device without interruption by an incoming call. An operating system process 301 associated with an operating system on the user device is executed by at least one processor configured to execute computer program instructions on the user device. The UMPCMS plays 302 media using an application programming interface (API), for example, the Facebook® API 311*a* of Facebook, Inc., or a YouTube® API 311*b* of Google Inc., as disclosed in the detailed description of FIG. 3B. The UMPCMS also plays 302, for example, online streaming media 332*a* or stored media 333 via the graphical user interface (GUI) on the user device.

When the uninterrupted media play and call management system (UMPCMS) receives a call text message 322 while the media is being played 302 via the graphical user interface (GUI) on the user device, the UMPCMS checks options 323 based on preconfigured criteria for rendering the notification objects generated as disclosed in the detailed description of FIG. 3B. Moreover, if the user is capturing an image using a camera 320 of the user device or is performing a video recording 321 when the incoming call is received, the UMPCMS sends an automated message to a sender of the call text message 322 as disclosed in the detailed description of FIG. 3B. If the preconfigured criteria indicate alerting the user device for communication through social media, the UMPCMS opens 324, for example, the Facebook® application programming interface (API) 311*a* for communication. The UMPCMS continues to the play 325 the media without rendering any notification if the preconfigured criteria do not indicate an alert for communication through social media. The UMPCMS checks options 326 for alerting the user device about the call text message 322. The UMPCMS continues to the play 325 the media without rendering any notification if the preconfigured criteria do not indicate alerting the user device through a blinder object. If the preconfigured criteria indicate alerting the user device through a blinder object configured, for example, as a hidden display, the UMPCMS displays hidden options 327 for call management. The hidden options 327 comprise, for example, responding to the alert by accepting the call 328 and initiating a text communication 329 with a sender of the call text message 322. If the user accepts the call 328, the UMPCMS executes a call functionality 330, and if the user selects text communication 329, the UMPCMS executes a text functionality 331.

Figure 3D:
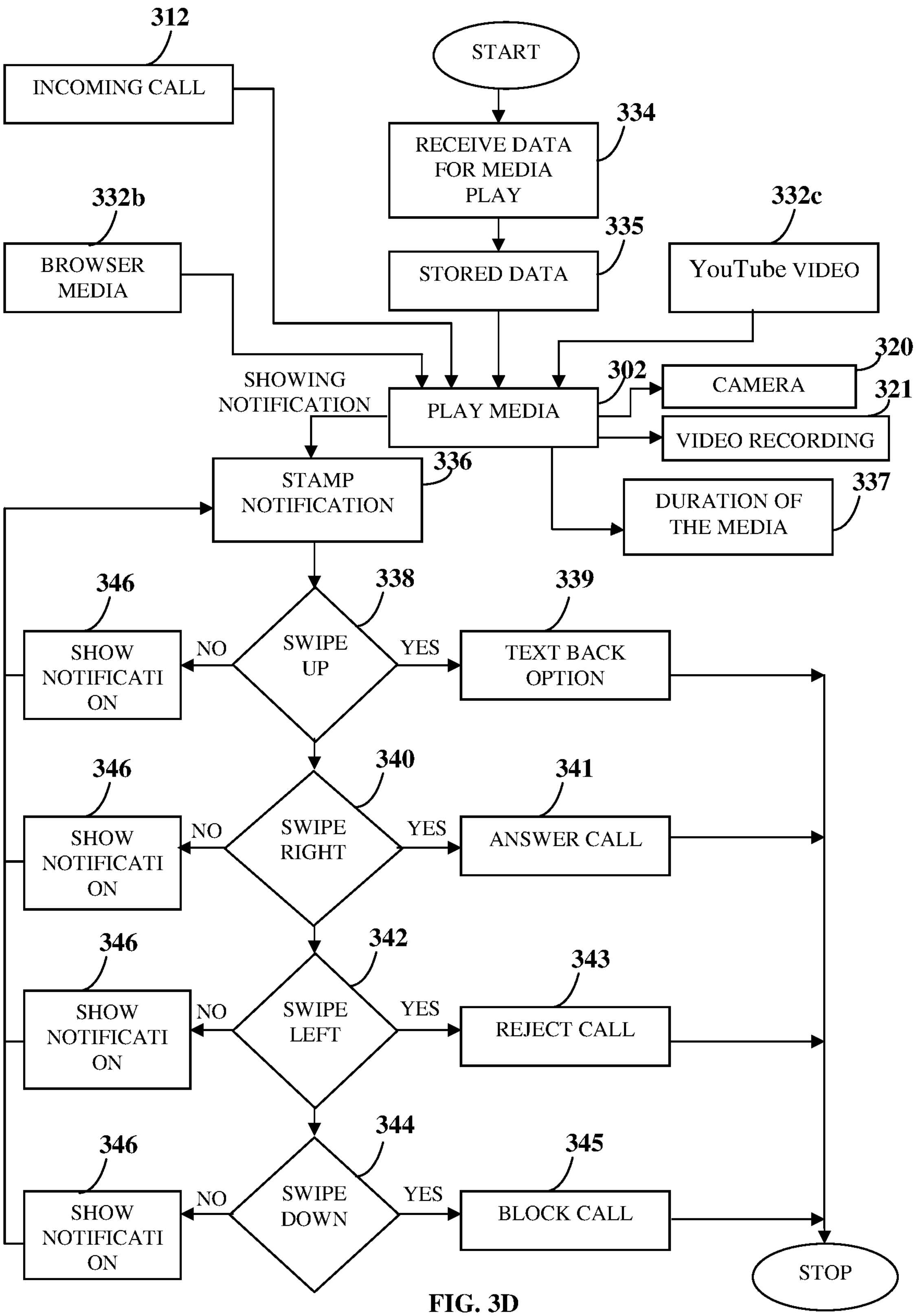
FIG. 3D exemplarily illustrates a flowchart comprising the steps performed by the uninterrupted media play and call management system for rendering a stamp object as a notification for an incoming call with call management options, and receiving a selection of a call management option during the playing of media on a user device for performing an executable action on the incoming call.

FIG. 3D exemplarily illustrates a flowchart comprising the steps performed by the uninterrupted media play and call management system (UMPCMS) for rendering a stamp object as a notification for an incoming call 312 with call management options, and receiving a selection of a call management option during the playing of media on a user device for performing an executable action on the incoming call 312. The UMPCMS receives 334 data for playing the media, for example, from a user of another user device or a cloud computing environment where the media was stored earlier. The UMPCMS stores the received data 335 on the user device. The UMPCMS plays 302 the media obtained from the stored data 335 on the user device, web browser media 332*b*, or media from a media content platform, for example, a YouTube® video 332*c* on the graphical user interface (GUI) provided by the UMPCMS.

When the uninterrupted media play and call management system (UMPCMS) receives an incoming call 312 on the user device while the media is being played 302, the UMPCMS overlays a stamp object with a stamp notification 336 with call management options on the media being played 302 as a translucent display as disclosed in the detailed description of FIG. 1. The overlay of the stamp object does not interrupt the media being played 302 on the graphical user interface (GUI) of the UMPCMS. The UMPCMS stores a duration 337 of the media being played 302. Moreover, if the user of the user device is capturing an image using a camera 320 of the user device or is performing a video recording 321 when the incoming call 312 is received, the UMPCMS sends an automated message to a caller of the incoming call 312 as disclosed in the detailed description of FIG. 3B. The stamp object with the stamp notification 336 comprises interface elements for the user to interact with the GUI to select one of the call management options. The UMPCMS checks for gesture inputs on a touch enabled display screen of the user device. If the UMPCMS detects a swipe up gesture 338 on an interface element of the stamp object, the UMPCMS implements a text back option 339 to allow the user to send a text message to the caller of the incoming call 312 on one of multiple interface sections of the GUI as configured by the UMPCMS. The playing 302 of the media continues uninterrupted on another interface section of the GUI as disclosed in the detailed description of FIG. 1. If the UMPCMS detects a swipe right gesture 340 on an interface element of the stamp object, the UMPCMS allows the user to answer 341 the incoming call 312. If the UMPCMS detects a swipe left gesture 342 on an interface element of the stamp object, the UMPCMS rejects 343 the incoming call 312, and if the UMPCMS detects a swipe down gesture 344 on an interface element of the stamp object, the UMPCMS automatically blocks 345 incoming calls 312 for the duration 337 of the media being played 302 to allow playing of the media without further notifications. If the UMPCMS does not detect any gesture on the GUI, the UMPCMS continues showing 346 the stamp notification 336 as a translucent display overlaid on the media being played on the GUI.

Figure 3E:
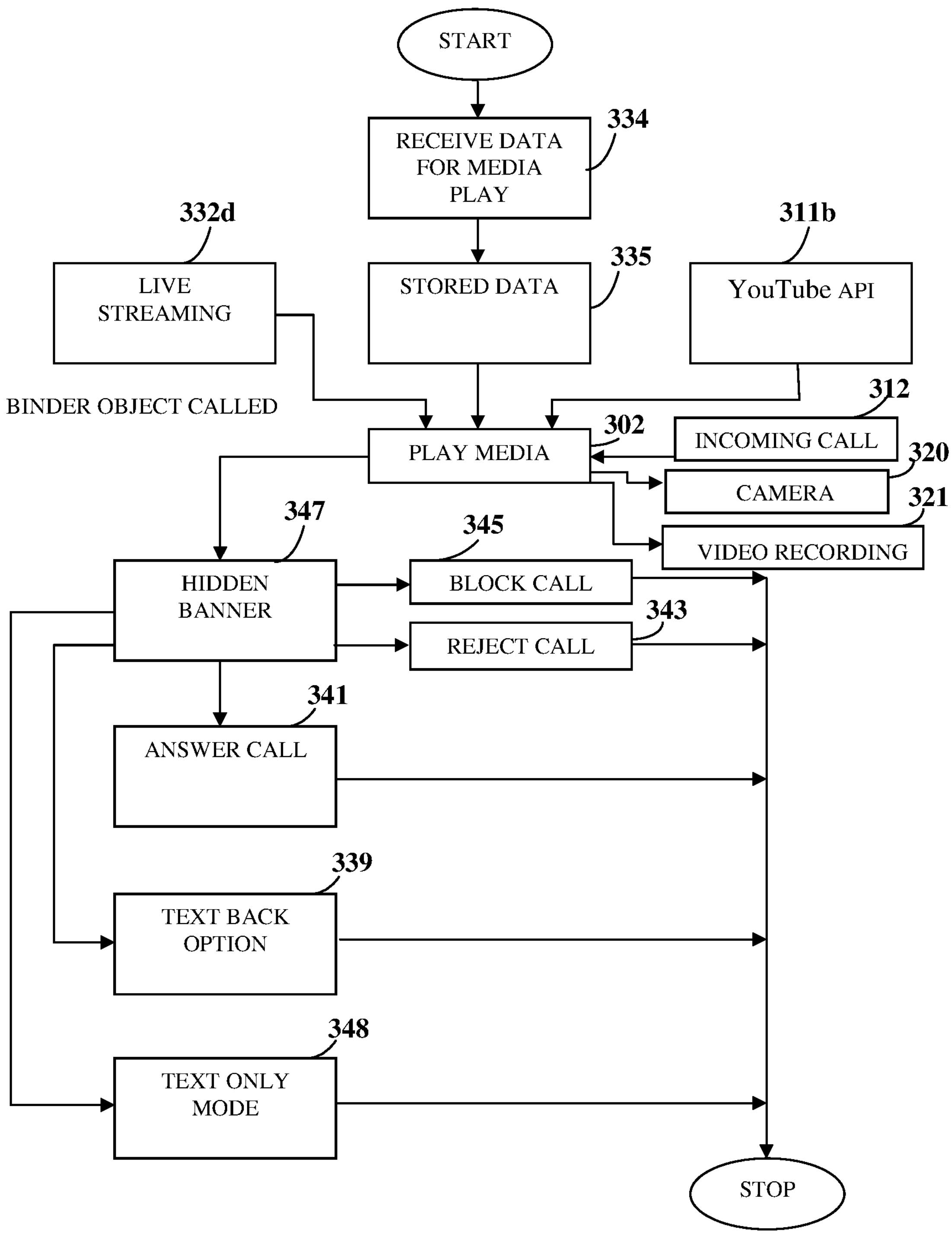
FIG. 3E exemplarily illustrates a flowchart comprising the steps performed by the uninterrupted media play and call management system for rendering a blinder object as a notification for an incoming call with call management options, and receiving a selection of a call management option during the playing of media on a user device for performing an executable action on the incoming call.

FIG. 3E exemplarily illustrates a flowchart comprising the steps performed by the uninterrupted media play and call management system (UMPCMS) for rendering a blinder object as a notification for an incoming call 312 with call management options, and receiving a selection of a call management option during the playing of media on a user device for performing an executable action on the incoming call 312. The UMPCMS receives 334 data for playing the media and stores the received data 335 on the user device. The UMPCMS plays 302 the media obtained from the stored data 335 on the user device, or live streaming media 332*d*, or a media from a media content platform, for example, a YouTube® video obtained via a YouTube® API 311*b*.

When the uninterrupted media play and call management system (UMPCMS) receives an incoming call 312 while the media is being played 302, the UMPCMS overlays a blinder object comprising a blinder notification as a hidden banner 347 on the graphical user interface (GUI) of the UMPCMS. The media being played 302 continues uninterrupted. Moreover, if the user is capturing an image using a camera 320 of the user device or is performing a video recording 321 when the incoming call 312 is received, the UMPCMS sends an automated message to a caller of the incoming call 312 as disclosed in the detailed description of FIG. 3B. On receiving a user input or detecting a user interaction with the user device, for example, pulling down with a finger from the top right corner of a touch screen enabled display screen of the user device, the UMPCMS displays the hidden banner 347 with call management options available for selection by the user. The call management options comprise, for example, block 345 the incoming call 312 for a duration of the media being played 302 and reject 343 the incoming call 312. The call management options further comprise, for example, an option to answer 341 the incoming call 312, to text back 339 the caller by splitting the GUI into multiple interface sections to allow simultaneous playing of the media and text communication between the user and the caller as disclosed in the detailed description of FIG. 1. An additional call management option is, for example, a text only mode 348 option that sends an automated message to a caller of the incoming call 312 indicating an availability of the user device only for text communication for the duration of the media being played 302.

Figure 3F:
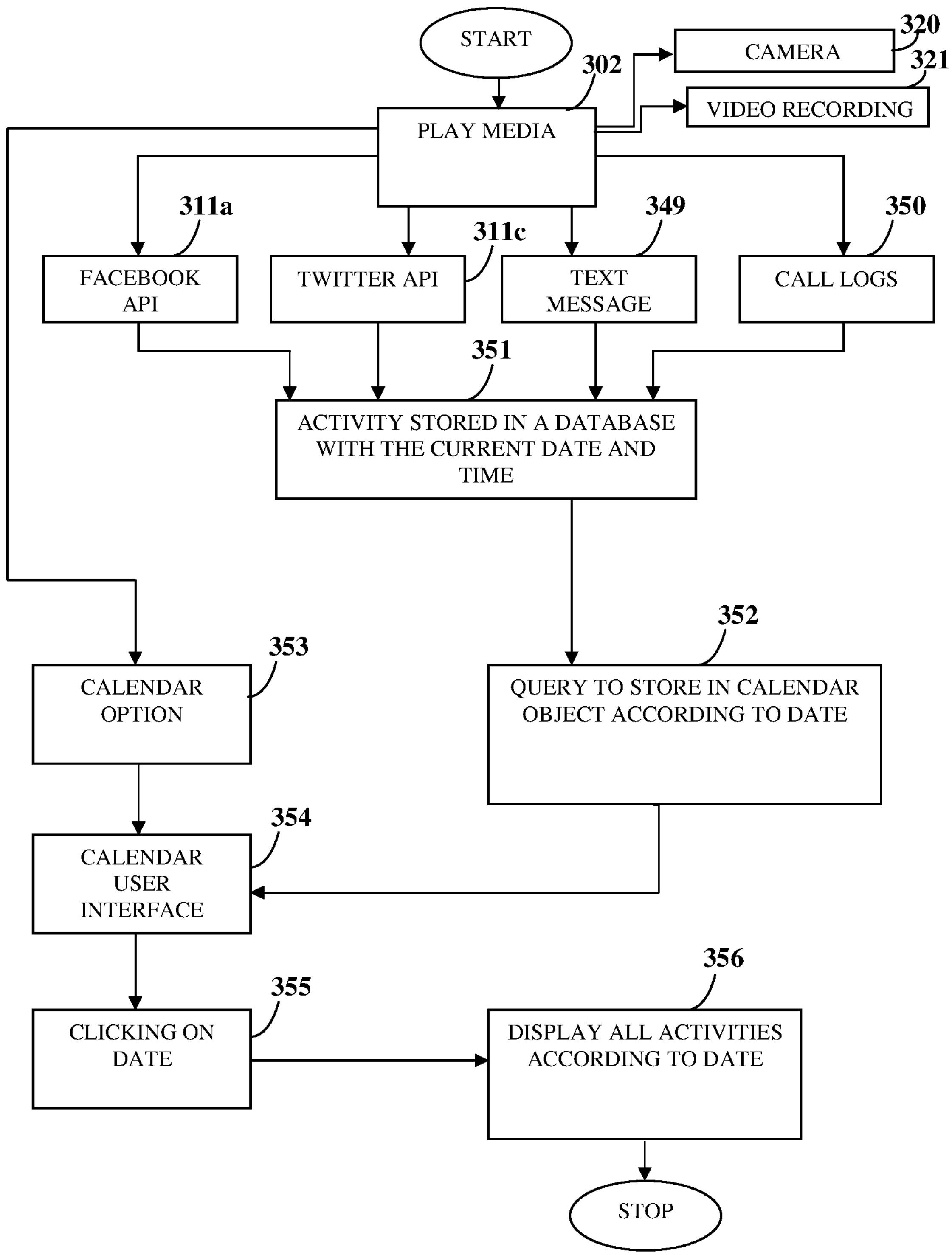
FIG. 3F exemplarily illustrates a flowchart comprising the steps performed by the uninterrupted media play and call management system for logging activities performed on a user device and accessing the logged activities via the calendar object during playing of media on the user device.

FIG. 3F exemplarily illustrates a flowchart comprising the steps performed by the uninterrupted media play and call management system (UMPCMS) for logging activities performed on a user device and accessing the logged activities via the calendar object during playing of media on the user device. The UMPCMS plays 302 media from one of a multiple sources of media based on a user's selection of the media received from the user device. In an embodiment, the UMPCMS logs activities performed on the user device, for example, from a Facebook® application programming interface (API) 311*a* and a Twitter® API 311*c*. The UMPCMS also logs communication activity in the form of text messages 349 and call logs 350 on the user device. The UMPCMS further logs imaging activities using a camera 320 of the user device and video recordings 321 on the user device, when the user device is equipped with an imaging device. The UMPCMS stores 351 the activities as events in a database with a date and time of each of the activities. On selecting a calendar option 353 from the calendar object rendered on the graphical user interface (GUI) of the uninterrupted media play and call management system (UMPCMS) or querying 352 to store a log of an activity in the calendar object, the UMPCMS displays a calendar user interface 354 on the GUI of the UMPCMS. On selecting a particular date by clicking 355 on the date in the calendar user interface 354, the UMPCMS displays 356 the log of the activities performed on the selected date.

Figure 3G:
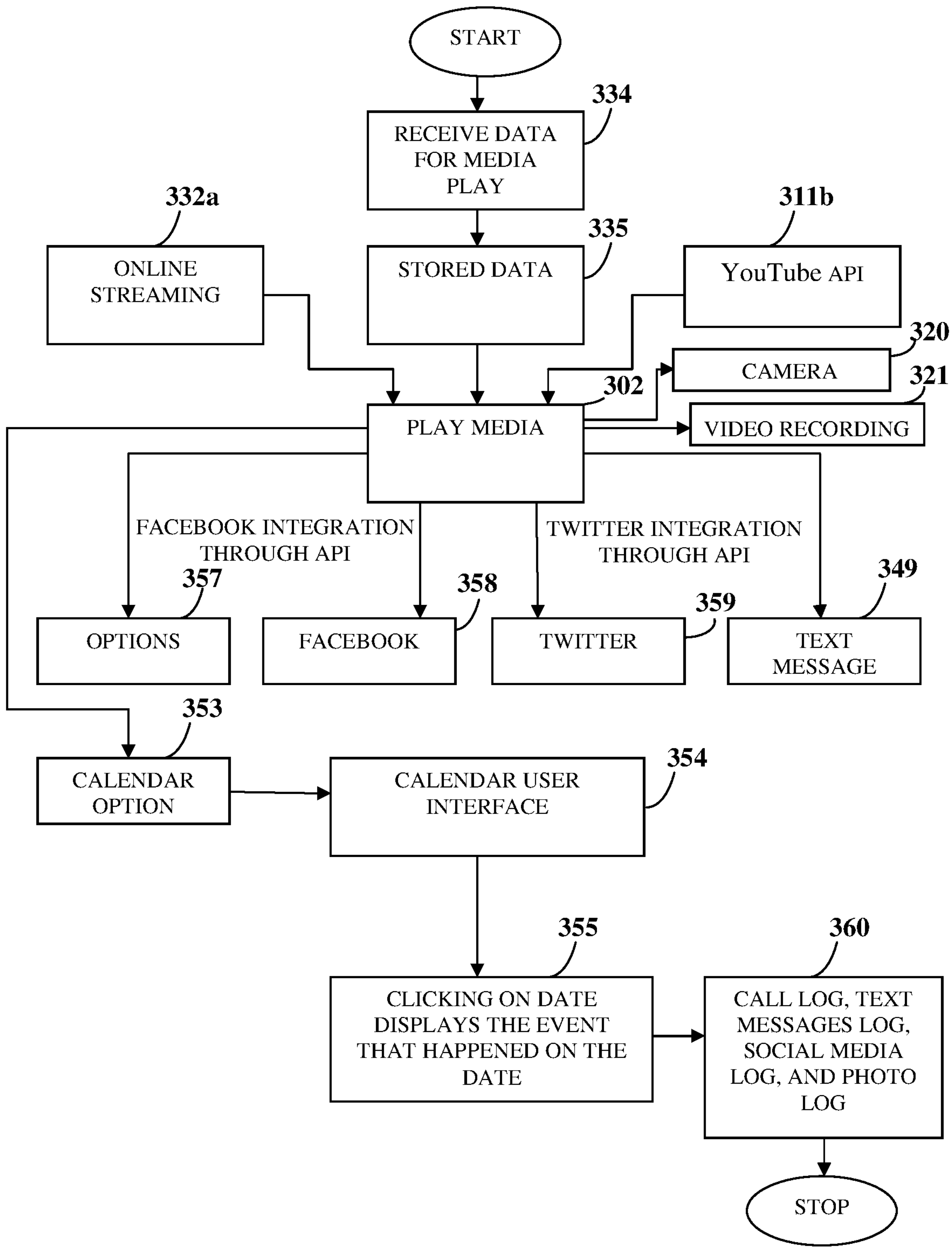
FIG. 3G exemplarily illustrates a flowchart comprising the steps performed by the uninterrupted media play and call management system for providing access to a log of activities performed on a user device via the calendar object during playing of media on the user device.

FIG. 3G exemplarily illustrates a flowchart comprising the steps performed by the uninterrupted media play and call management system (UMPCMS) for providing access to a log 360 of activities performed on a user device via the calendar object during playing of media on the user device. The UMPCMS receives 334 data for playing the media on the user device and stores the received data 335 on the user device. The UMPCMS plays 302 the media obtained from the stored data 335 on the user device, online streaming media 332*a*, or media obtained from a media content platform, for example, a YouTube® video obtained via a YouTube® application programming interface (API) 311*b* on a graphical user interface (GUI) provided by the UMPCMS. The UMPCMS provides integration with third party social networking applications, for example. Facebook® 358 and Twitter® 359 through their respective APIs. The UMPCMS further allows the user to send a text message 349 to a user of another user device, for example, to comment on the media being played 302 and provides the user access to imaging activities using a camera 320 and video recording 321 on the user device, when the user device is equipped with an imaging device. The UMPCMS also provides other options 357 during playing 302 of the media, for example, recording the media on the user device and/or in a cloud computing environment as disclosed in the detailed description of FIG. 1. On selecting a calendar option 353 from the calendar object rendered on the GUI of the UMPCMS, the UMPCMS displays a calendar user interface 354 on the GUI of the UMPCMS. On selecting a particular date by clicking 355 on the date in the calendar user interface 354, the UMPCMS displays a log 360 of the activities performed on the selected date. The log 360 of the activities comprise, for example, a log of calls, text messages, social media shared on social networking applications, a photo log with images captured on the user device, etc.

Figure 4:
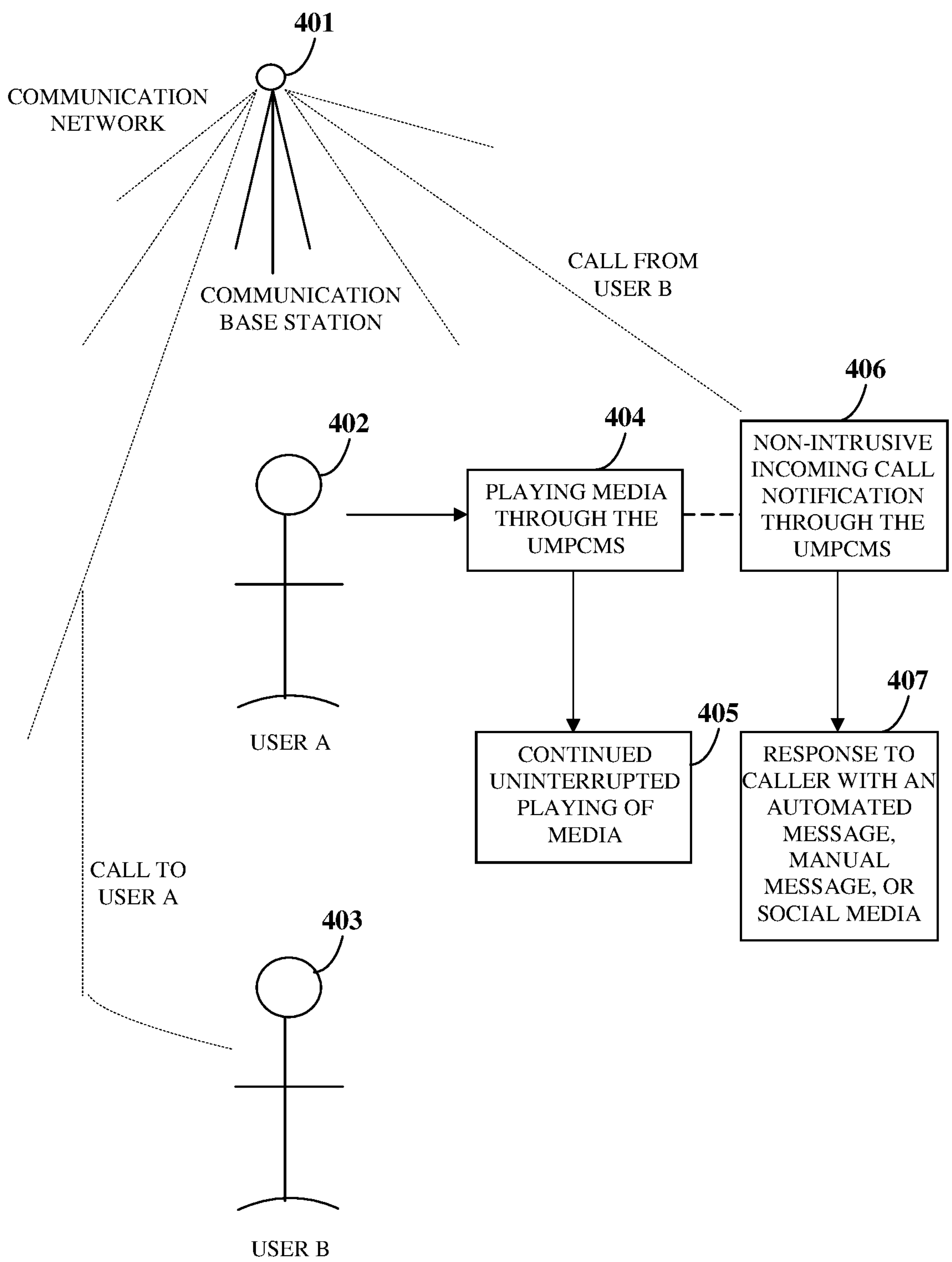
FIG. 4 exemplarily illustrates communication between a caller and a recipient of an incoming call through a communication network during playing of media on a user device of the recipient, without interrupting the playing of the media on the user device.

FIG. 4 exemplarily illustrates communication between a caller and a recipient of an incoming call through a communication network during playing of media on a user device of the recipient, without interrupting the playing of the media on the user device. As exemplarily illustrated in FIG. 4, user devices of a recipient User A 402 and a caller User B 403 are connected to each other through the communication network established using a communication base station 401. An examples of a communication network is a mobile communication network such as the AT&T® network of AT&T Inc., which connects to and identifies user devices, for example, through subscriber identification module (SIM) cards inserted into the user devices. User A 402 can play 404 media through the uninterrupted media play and call management system (UMPCMS) via a graphical user interface (GUI) provided by the UMPCMS on the user device of User A 402 as disclosed in the detailed description of FIG. 1.

When User B 403 places a call to User A 402 through the communication network 402, the call is routed through the communication base station 401 and received at the user device of User A 402. The user device of User A 402 receives a non-intrusive incoming call notification 406 in the form of a notification object through the uninterrupted media play and call management system (UMPCMS), without interrupting the media being played on the user device as disclosed in the detailed description of FIG. 1. The notification object comprises call management options in one of multiple configurable formats based on preconfigured criteria available for selection by User A 402 through the GUI of the UMPCMS as disclosed in the detailed description of FIG. 1. The incoming call notification 406 notifies User A 402 that User B 403 is calling without interrupting the playing of the media on User A's 402 user device and allows User A 402 and User B 403 to communicate, for example, through a text message or a social media communication simultaneously. On selection of a call management option to respond to the incoming call by User A 402, the UMPCMS on the user device of User A 402 allows User A 402 to send a response 407 to User B 403, for example, via an automated text message, a manual text message, etc., or through social media according to the configuration of the UMPCMS as disclosed in the detailed descriptions of FIGS. 1-2. The UMPCMS further allows simultaneous continued uninterrupted playing 405 of the media on the user device during the communication between User A 402 and User B 403.

Figure 5:
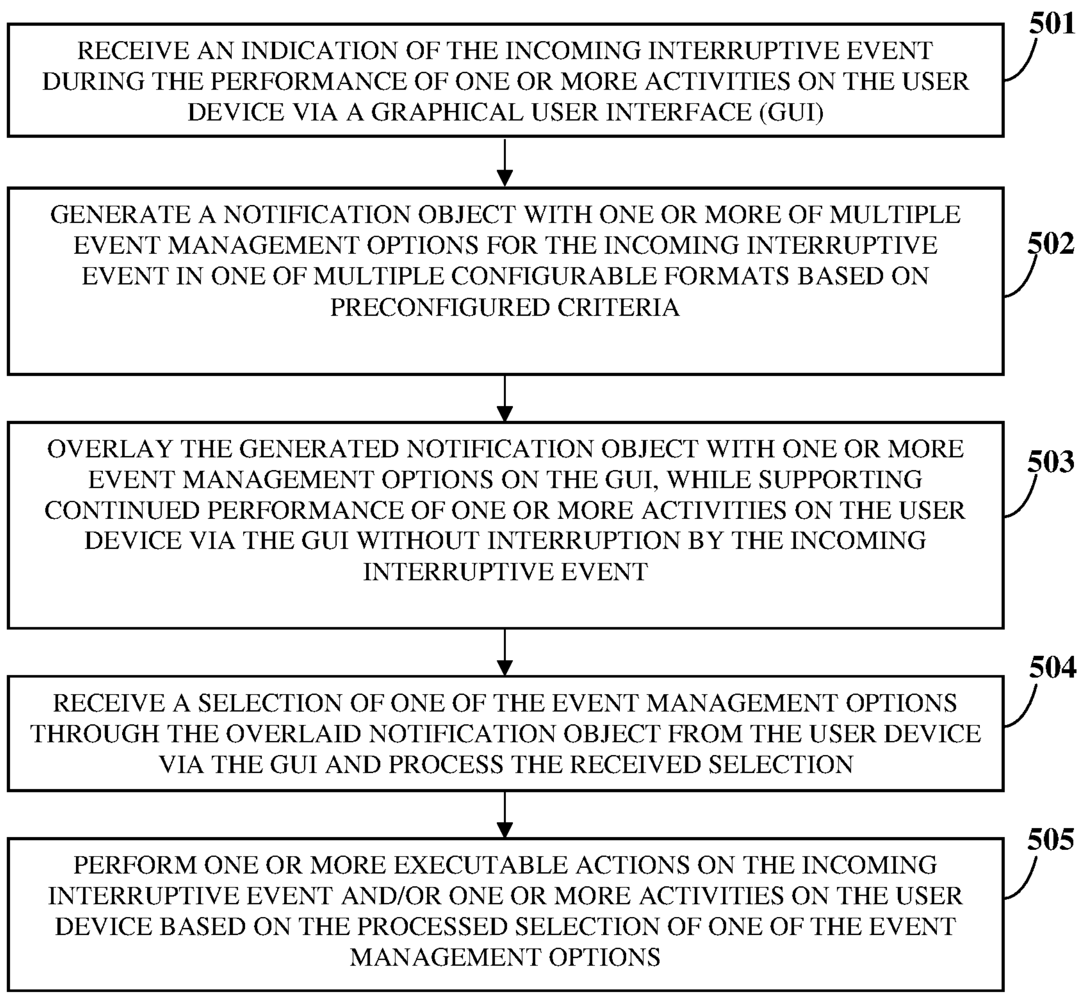
FIG. 5 illustrates a method for managing an incoming interruptive event during performance of one or more activities on a user device, without interrupting the performance of the activities on the user device.

FIG. 5 illustrates a method for managing an incoming interruptive event during performance of one or more activities on a user device, without interrupting the performance of the activities on the user device. As used herein, "incoming interruptive event" refers to an event received from an external source that interrupts or disturbs performance of activities on a user device. Examples of incoming interruptive events comprise an incoming call as disclosed in the detailed description of FIG. 1, an incoming message from device applications, incoming requests for performing control actions on the user device, alarms set on the user device, device messages related to power consumption, power charging required, etc. The method disclosed herein employs the uninterrupted media play and call management system (UMPCMS) executable by at least one processor configured to execute computer program instructions for managing an incoming interruptive event during performance of one or more activities on a user device, without interrupting the performance of the activities on the user device.

A user can perform multiple activities via a graphical user interface (GUI) provided by the uninterrupted media play and call management system (UMPCMS) on the user device. The activities comprise, for example, playing media accessible on media content platforms, for example, YouTube® of Google Inc., NETFLIX® of Netflix, Inc., Google Chromecast® of Google Inc., Livestream® of Livestream LLC, etc., viewing a live media broadcast, rating quality of media being consumed on the user device, sharing the media being consumed with other user devices and communicating with the other user devices concurrently, social networking, etc., on a graphical user interface (GUI). In an embodiment, the UMPCMS authenticates the user prior to allowing the user to perform one or more activities on the user device via the GUI. The GUI provided by the UMPCMS allows a user to trigger multiple activities on the user device. For example, the UMPCMS allows the user to perform activities such as browsing internet content through a web browser, accessing data stored in a cloud computing environment, viewing streaming media, viewing live broadcasts, recording media, imaging, social networking, communicating with users of other user devices by placing phone calls, sending text messages, sharing media, sending electronic mails (emails), logging activities performed on the user device in a calendar object along with creating and scheduling user events in the calendar object and accessing other applications on the user device.

In the method disclosed herein, when a sender of an interruptive event attempts to communicate with a recipient, the uninterrupted media play and call management system (UMPCMS) on the recipient's user device receives 501 an indication of the incoming interruptive event, during the performance of one or more activities on the user device via the graphical user interface (GUI) on the user device. The UMPCMS generates 502*a* notification object with one or more event management options for the incoming interruptive event in one of multiple configurable formats based on preconfigured criteria. The generated notification object comprises, for example, one or more identifiers of the sender of the incoming interruptive event. The identifiers comprise, for example, a name, a contact number, an image of the sender, social media information, etc. The generation of the notification object is disclosed in the detailed description of FIG. 1. The event management options comprise, for example, accepting the incoming interruptive event, rejecting the incoming interruptive event, sending a text communication to a sender of the incoming interruptive event, sending an automated message indicating an unavailability of the user device for any communication for a duration of the activities, sending an automated message indicating an availability of the user device only for the text communication for the duration of the activities, forwarding the incoming interruptive event to a predefined destination, etc.

The preconfigured criteria for the generation of the notification object with the event management options comprise, for example, blocking the incoming interruptive event, allowing only text communication, accepting the incoming interruptive event while supporting the continued performance of one or more activities on the user device via the graphical user interface (GUI) provided by the uninterrupted media play and call management system (UMPCMS) without the interruption by the incoming interruptive event, vibrating the user device, etc. A user has the option to configure the UMPCMS to block all incoming interruptive events to support uninterrupted performance of the activities via the GUI. The user also has the option to configure the UMPCMS to allow only text communication to support, for example, uninterrupted consumption of audio content of the media and communicate with prospective senders of incoming interruptive events through text messages. The notification objects in different configurable formats generated by the uninterrupted media play and call management system (UMPCMS) comprise, for example, a calendar object with an image of the sender, name of the sender, a time and a date of the incoming interruptive event, a stamp object with an image of the sender, name of the sender, a time and a date of the incoming interruptive event, and a blinder object. In an embodiment, the UMPCMS allows the user to configure the notification objects in one of the configurable formats via the graphical user interface (GUI) of the UMPCMS.

The uninterrupted media play and call management system (UMPCMS) overlays 503 the generated notification object with one or more of the event management options on the graphical user interface (GUI), while supporting continued performance of the activities on the user device via the GUI without interruption by the incoming interruptive event. In an embodiment, the UMPCMS overlays the generated notification object with the event management options on the GUI as a translucent display on a display screen of the user device while supporting the continued performance of the activities on the user device via the GUI without the interruption by the incoming interruptive event. By overlaying the generated notification object as a translucent display, the UMPCMS allows a user to view the entire display screen of the user device for performing one or more activities without interruption by the notification object. The UMPCMS renders the generated notification object on the graphical user interface (GUI) without interrupting the performance of an activity, for example, playing of a video, by displaying the notification object in a non-intrusive manner as disclosed in the detailed description of FIG. 1.

On viewing the notification object overlaid by the uninterrupted media play and call management system (UMPCMS) on the graphical user interface (GUI), while performing one or more activities on the user device, the user may select one of the event management options from the notification object to manage an incoming interruptive event. For example, a user may swipe interface elements associated with a notification object overlaid on the GUI on the touch enabled display screen of the user device with a finger or any input device capable of providing a touch input on the notification object in different directions to select different event management options as disclosed in the detailed description of FIG. 1. When the user selects one of the event management options through the overlaid notification object on the GUI, the UMPCMS receives 504 the selection of the event management option through the overlaid notification object from the user device via the GUI and processes the received selection of the event management option, while the user continues performance of one or more activities on the user device. The UMPCMS subsequently performs 505 one or more executable actions on the incoming interruptive event and/or the activities on the user device based on the processed selection of the event management option.

In an embodiment, the performance of the executable actions on the incoming interruptive event and/or the activities on the user device by the uninterrupted media play and call management system (UMPCMS) comprises configuring the graphical user interface (GUI) into multiple interface sections to allow a recipient of the incoming interruptive event to execute the selected event management option during the performance of one or more activities on the user device. In this embodiment, the UMPCMS executes the selected event management option on one of the interface sections of the GUI and continues the performance of the activities on the other interface sections of the GUI. For example, when a user of a user device selects the event management option to send a text communication to a caller of an incoming call through an interface element of a corresponding notification object overlaid by the UMPCMS on the GUI while playing media, the UMPCMS configures the GUI into two interface sections. The UMPCMS then allows the user to send the text communication on the second interface section while supporting continued playing of the media on the first interface section of the GUI. In another embodiment, when the incoming call is accepted by a user, the UMPCMS pauses the playing of the media and records the media being played for later use in the user device and/or the cloud computing environment for a duration of the incoming call. After the incoming call ends, the UMPCMS renders an option to the user to resume the playing of the media on the GUI.

When media associated with the activities being performed on the user device comprises an audio component and a video component, the uninterrupted media play and call management system (UMPCMS) reversibly replaces the audio component of the media with audio of the incoming interruptive event, while rendering the video component of the media on the graphical user interface (GUI) for a duration of execution of the incoming interruptive event. On completion of the incoming interruptive event, the UMPCMS resumes the audio component of the media on the user device. In an embodiment, the UMPCMS configures a calendar object to log the incoming interruptive event on the user device, the performance of the activities on the user device, and the executable actions performed on the incoming interruptive event and/or the performance of the activities on the user device. In another embodiment, the UMPCMS configures the calendar object to log the incoming interruptive event, the performance of the activities on the user device, and the executable actions performed on the incoming interruptive event and/or the performance of the activities on the user device.

In an embodiment, the graphical user interface (GUI) provided by the uninterrupted media play and call management system (UMPCMS) displays a list of options associated with the playing of the media on the user device on receiving user inputs from the user device. In an embodiment, the UMPCMS renders this list of options as a hidden display to allow non-intrusive viewing of the media on the GUI. The list of options comprise, for example, recording the streaming media or only an audio component of the streaming media, where available, for later use in the user device and/or in the cloud computing environment, sharing the streaming media with users of other user devices, and switching to other available streaming media and live broadcasts. The list of options further comprises, for example, blocking incoming interruptive events for a duration of the streaming media to support uninterrupted consumption of the media and allowing only text communication for a duration of the streaming media to support communication with prospective senders of incoming interruptive events along with continued uninterrupted consumption of the media. The list of options further comprises, for example, viewing the streaming media and sending text communication to users of other user devices or engaging in social networking through third party applications concurrently. In an embodiment, on receiving a selection of an option from the list from the user device via the GUI, the UMPCMS reversibly configures the GUI into multiple interface sections for playing up to a predetermined number of media on the GUI or for communicating with users of other user devices. For example, the UMPCMS reversibly configures the GUI into a first interface section and a second interface section for allowing access to text communication or social networking through third party applications on the second interface section during the continued streaming of media on the first interface section. The UMPCMS reverses the configuration of the GUI into a first interface section and a second interface section on receiving a selection of an option from the list from the user device via the GUI.

The list of options further comprises, for example, granting access to an in-built application in the user device for the user to perform social networking activities while streaming the media. The in-built application for social networking while viewing live broadcasts and streaming media via the graphical user interface (GUI) of the uninterrupted media play and call management system (UMPCMS) provides access to live broadcasts and streaming media for consumption by the user of the user device. The in-built application allows the user to share media with users of other user devices and also receive media shared by the users of the other user devices. Furthermore, the in-built application receives ratings, messages, and comments on the media shared between the user and users of other user devices from the user. The in-built application also bookmarks the media for easy retrieval by the user at a later point of time. The in-built application also records the media on the user device or on data storage in cloud computing environments, shares the media with other user devices, and allows social networking for the user to communicate with users of other user devices according to user specifications. The in-built application also provides an option to view media and engage in social networking concurrently. When the media being viewed is shared with other user devices or when media is received from users of other user devices, the UMPCMS reversibly configures the GUI into multiple interface sections for allowing access to text communication or social networking on one of the interface sections during the continued streaming of the media on the other interface sections. The UMPCMS reverses the configuration of the GUI into multiple interface sections on receiving an input from the user via the GUI to allow a user selected interface section to occupy the entire GUI.

Figure 6:
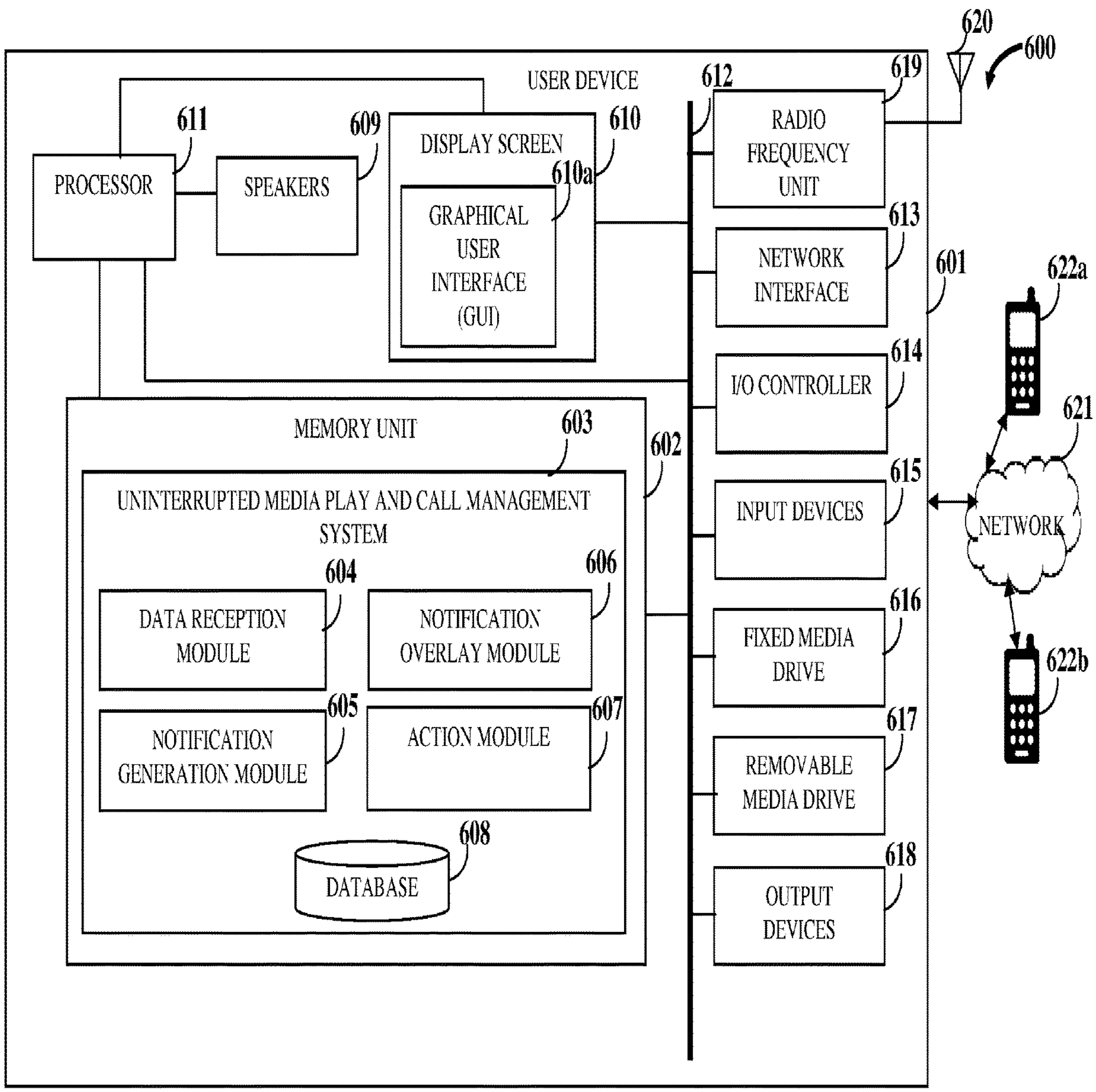
FIG. 6 exemplarily illustrates a system comprising an uninterrupted media play and call management system implemented on a user device for managing an incoming call during playing of media on the user device, without interrupting the playing of the media on the user device.

FIG. 6 exemplarily illustrates a system 600 comprising the uninterrupted media play and call management system (UMPCMS) 603 implemented on a user device 601 for managing an incoming call during playing of media on the user device 601, without interrupting the playing of the media on the user device 601. The user device 601 is an electronic device, for example, a personal computer, a tablet computing device, a mobile computer, a mobile phone, a smartphone, a portable computing device, a personal digital assistant, a laptop, a wearable computing device such as the Google Glass® of Google Inc., the Apple Watch® of Apple Inc., etc., a touch centric device, a client device, a portable electronic device, a network enabled computing device, an interactive network enabled communication device, a gaming device, an image capture device, any other suitable computing equipment, combinations of multiple pieces of computing equipment, etc. In an embodiment, the user device 601 is a hybrid computing device that combines the functionality of multiple devices. Examples of a hybrid computing device comprise a cellular telephone that includes a media player functionality, a gaming device that includes a wireless communications capability, a cellular telephone that includes game and multimedia functions, and a portable device that receives electronic mail (email), supports mobile telephone calls, has a media player functionality, and supports web browsing. In an embodiment, computing equipment is used to implement applications such as media playback applications, for example, iTunes® from Apple Inc., a web browser, an electronic mail (email) application, a calendar application, etc. The user device 601 employs the UMPCMS 603 for managing an incoming call during playing of media on the user device 601, without interrupting the playing of the media on the user device 601.

The user device 601 is a computer system that is programmable using a high level computer programming language. In an embodiment, the uninterrupted media play and call management system (UMPCMS) 603 is implemented on the user device 601 using programmed and purposeful hardware. The user device 601 communicates with one or more user devices 622*a* and 622*b* via the network 621, for example, a short range network or a long range network. The network 621 is, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks. In an embodiment, the UMPCMS 603 is accessible to users, for example, through a broad spectrum of technologies and devices such as cellular phones, tablet computing devices, etc., with access to the internet.

As exemplarily illustrated in FIG. 6, the user device 601 comprises a non-transitory computer readable storage medium, for example, a memory unit 602 for storing programs and data, and at least one processor 611 communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 611, except for a transitory, propagating signal. The non-transitory computer readable storage medium is configured to store computer program instructions defined by modules, for example, 604, 605, 606, 607, etc., of the uninterrupted media play and call management system (UMPCMS) 603. The UMPCMS 603 is installed and stored in the memory unit 602 of the user device 601. The memory unit 602 is used for storing program instructions, applications, and data. The memory unit 602 is, for example, a random access memory (RAM) or another type of dynamic storage device that stores information and instructions for execution by the processor 611. The memory unit 602 also stores temporary variables and other intermediate information used during execution of the instructions by the processor 611. The UMPCMS 603 further comprises a read only memory (ROM) or another type of static storage device that stores static information and instructions for the processor 611.

The processor 611 is configured to execute the computer program instructions defined by the uninterrupted media play and call management system (UMPCMS) 603. The processor 611 refers to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 611 is implemented as a processor set comprising, for example, a programmed microprocessor and a math or graphics co-processor. The processor 611 is selected, for example, from the Intel® processors such as the Itanium® microprocessor or the Pentium® processors, Advanced Micro Devices (AMD®) processors such as the Athlon® processor, UltraSPARC® processors, microSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The UMPCMS 603 disclosed herein is not limited to employing a processor 611. In an embodiment, the UMPCMS 603 employs a controller or a microcontroller. The processor 611 executes the modules, for example, 604, 605, 606, 607, etc., of the UMPCMS 603.

As exemplarily illustrated in FIG. 6, the user device 601 further comprises an antenna 620, a radio frequency unit 619, a data bus 612, a network interface 613, an input/output (110) controller 614, input devices 615, a fixed media drive 616 such as a hard drive, a removable media drive 617 for receiving removable media, output devices 618, etc. The uninterrupted media play and call management system (UMPCMS) 603 communicates with the radio frequency unit 619 to detect an incoming call via the antenna 620. In an embodiment, the antenna 620 of the user device 601 is slidable and can be used for writing and providing other user inputs on the user device 601. The data bus 612 permits communications between the modules, for example, 602, 611, 609, 610, 613, 614, 615, 616, 617, 618, 619, etc., of the user device 601. The network interface 613 enables connection of the UMPCMS 603 in the user device 601 to the network 621. In an embodiment, the network interface 613 is provided as an interface card also referred to as a line card. The network interface 613 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols. Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 614 controls input actions and output actions performed by the UMPCMS 603.

The display screen 610, via the graphical user interface (GUI) 610*a*, display information, display interfaces, user interface elements such as swipable arrows, icons, etc., for example, for displaying the notification objects generated by the uninterrupted media play and call management system (UMPCMS) 603 during the playing of the media on the user device 601, for displaying one or more call management options for the incoming call, etc. The display screen 610 comprises, for example, a video display, a liquid crystal display, a plasma display, an organic light emitting diode (OLED) based display, etc. The UMPCMS 603 renders the GUI 610*a* on the display screen 610 to receive user inputs, the user's selection of a call management option that allows the user to manage an incoming call during playing of media on the user device 601, etc. The GUI 610*a* is, for example, an online web interface, a web based downloadable application interface, a mobile based downloadable application interface, etc. The display screen 610 displays the GUI 610*a*. The input devices 615 are used for inputting data into the UMPCMS 603. The user uses the input devices 615 to provide inputs to the UMPCMS 603. For example, the user configures the notification objects, selects a call management option for accepting or rejecting the incoming call, sending a text communication to a caller of the incoming call, etc., using the input devices 615. The input devices 615 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. The user device 601 further comprises speakers 609. The UMPCMS 603 communicates with the speakers 609 to perform one or more executable actions on the incoming call and/or playing of the media on the user device 601. For example, the UMPCMS 603 controls the speakers 609 to mute the audio of the media being played or adjust the volume of the media to a volume lower than the volume of the caller speaking, when the user accepts an incoming call.

The uninterrupted media play and call management system (UMPCMS) 603 is activated on the user device 601 via the graphical user interface (GUI) 610*a*. The UMPCMS 603 comprises a data reception module 604, a notification generation module 605, a notification overlay module 606, and an action module 607 stored in the memory unit 602 of the user device 601. The data reception module 604 receives an indication of the incoming call during the playing of the media on the user device 601 via the GUI 610*a*. The notification generation module 605 generates a notification object, for example, a stamp object, a calendar object, a blinder object, etc., with one or more call management options for the incoming call in one of the configurable formats based on preconfigured criteria as disclosed in the detailed description of FIG. 1. The notification overlay module 606 overlays the generated notification object with one or more call management options on the GUI 610*a*, while supporting continued playing of media on the user device 601 via the GUI 610*a* without interruption by the incoming call. In an embodiment, the notification overlay module 606 overlays the generated notification object with one or more call management options on the GUI 610*a* as a translucent display or a hidden display, while supporting the continued playing of media on the user device 601 via the GUI 610*a* without the interruption by the incoming call.

The data reception module 604 further receives and processes a selection of one of the call management options through the overlaid notification object from the user device 601 via the graphical user interface (GUI) 610*a*. In an embodiment, the notification object in one of the configurable formats further comprises one or more interface elements in operable communication with the data reception module 604 for receiving the selection of one of the call management options from the user device 601 via the GUI 610*a*. In an embodiment, the data reception module 604 further receives user voice commands for the playing of the media on the user device 601 via the GUI 610*a*. The action module 607 performs one or more executable actions on the incoming call and/or the playing of the media on the user device 601 based on the received and processed selection of the call management options. In an embodiment, the action module 607 configures the GUI 610*a* into a configurable number of interface sections to allow a recipient of the incoming call to execute one of the call management options during the playing of the media on the user device 601. The action module 607 performs splitting of the GUI 610*a* when the user taps an interface element, for example, a split screen button on the GUI 610*a* that allows user to split the GUI 610*a* with video play to execute options for social media or worldwide web text or web search activities. In this embodiment, the action module 607 executes one of the call management options on one of the interface sections of the GUI 610*a*, and continues the playing of the media on another interface section of the GUI 610*a*. In another embodiment, the action module 607 records the media being played on the user device 601 for later use in the user device 601 and/or in a cloud computing environment for a duration of the incoming call.

In an embodiment, the action module 607 reversibly replaces an audio component of the media being played on the user device 601 with audio of the incoming call, while rendering a video component of the media being played on the graphical user interface (GUI) 610*a* for a duration of the incoming call. In an embodiment, the uninterrupted media play and call management system (UMPCMS) 603 renders audio to different audio output devices, for example, by using Java Sound application programming interface (API) of the Java® programming language to create mixer objects and instantiated methods from an audio system class to handle one or more streams of audio output. In another embodiment, the action module 607 reversibly configures the GUI 610*a* into multiple interface sections for playing of up to a predetermined number of media simultaneously. In another embodiment, the notification generation module 605 further configures a calendar object to log the incoming call, the activities performed on the user device 601, for example, the playing of the media on the user device 601, and one or more executable actions performed on the incoming call and/or the playing of the media on the user device 601. The notification generation module 605 also configures the calendar object to log data comprising, for example, messages communicated between users, recordings of the media in the user device 601 and/or in the cloud computing environment, ratings of quality of the media, images, and social media, and create and schedule recording of the media and user events.

In an embodiment, the uninterrupted media play and call management system (UMPCMS) 603 stores a log of a duration of each communication, a log of missed communication attempts by users of other user devices 622*a* and 622*b*, voice calls, text messages sent from or received by the user of the user device 601, messages sent by the user, messages received by the user, and media shared between the user and users of other devices 622*a* and 622*b* in the in-built application and third party applications for social networking while viewing live broadcasts and streaming media, images captured through imaging activities on the user device 601, a log of images and other media sent to and received from users of other user devices 622*a* and 622*b* by the user of the user device 601, a schedule of recording of media on the user device 601, etc., in a database 608. The database 608 of the UMPCMS 603 can be any storage area or medium that can be used for storing data and files. In an embodiment, the UMPCMS 603 stores the logs in external databases, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In an embodiment, the database 608 can also be a location on a file system. In another embodiment, the database 608 can be remotely accessed by the UMPCMS 603 via the network 621. In another embodiment, the database 608 is configured as a cloud based database implemented in a cloud computing environment, where computing resources are delivered as a service over the network 621.

Computer applications and programs are used for operating the uninterrupted media play and call management system (UMPCMS) 603. The programs are loaded onto the fixed media drive 616 and into the memory unit 602 of the user device 601 via the removable media drive 617. In an embodiment, the computer applications and programs may be loaded directly on the user device 601 via the network 621. Computer applications and programs are executed by double clicking a related icon displayed on the display screen 610 using one of the input devices 615. The output devices 618 output the results of operations performed by the UMPCMS 603. For example, the UMPCMS 603 renders the notification objects with one or more call management options to the user of the UMPCMS 603 using the output devices 618.

The processor 611 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. The uninterrupted media play and call management system (UMPCMS) 603 employs the operating system for performing multiple tasks. The operating system is responsible for management and coordination of activities and sharing of resources of the UMPCMS 603. The operating system further manages security of the UMPCMS 603, peripheral devices connected to the UMPCMS 603, and network connections. The operating system employed on the UMPCMS 603 recognizes, for example, inputs provided by the user of the user device 601 using one of the input devices 615, the output devices 618, files, and directories stored locally on the fixed media drive 616. The operating system on the UMPCMS 603 executes different programs using the processor 611. The processor 611 and the operating system together define a computer platform for which application programs in high level programming languages are written. The operating system of the user device 601 determines the programming languages used in the UMPCMS 603. For example, the Java® programming language is used for developing the UMPCMS 603 on the user device 601 with an Android® operating system, while Objective-C@ of Apple Inc., is used for developing the UMPCMS 603 on the user device 601 with the iOS operating system, and the UNITY® libraries and platforms of Unity IPR ApS, LLC., are used developing the UMPCMS 603 for both the Android® operating system and the iOS operating system.

The processor 611 retrieves instructions defined by the data reception module 604, the notification generation module 605, the notification overlay module 606, and the action module 607, for performing respective functions disclosed above. The processor 611 retrieves instructions for executing the modules, for example, 604, 605, 606, 607, etc., of the uninterrupted media play and call management system (UMPCMS) 603 from the memory unit 602. A program counter determines the location of the instructions in the memory unit 602. The program counter stores a number that identifies the current position in the program of each of the modules, for example, 604, 605, 606, 607, etc., of the UMPCMS 603. The instructions fetched by the processor 611 from the memory unit 602 after being processed are decoded. The instructions are stored in an instruction register in the processor 611. After processing and decoding, the processor 611 executes the instructions, thereby performing one or more processes defined by those instructions.

At the time of execution, the instructions stored in the instruction register are examined to determine the operations to be performed. The processor 611 then performs the specified operations. The operations comprise arithmetic operations and logic operations. The operating system performs multiple routines for performing a number of tasks required to assign the input devices 615, the output devices 618, and the memory unit 602 for execution of the modules, for example, 604, 605, 606, 607, etc., of the uninterrupted media play and call management system (UMPCMS) 603. The tasks performed by the operating system comprise, for example, assigning memory to the modules, for example, 604, 605, 606, 607, etc., of the UMPCMS 603, and to data used by the UMPCMS 603, moving data between the memory unit 602 and disk units, and handling input/output operations. The operating system performs the tasks on request by the operations and after performing the tasks, the operating system transfers the execution control back to the processor 611. The processor 611 continues the execution to obtain one or more outputs. The outputs of the execution of the modules, for example, 604, 605, 606, 607, etc., of the UMPCMS 603 are displayed to the user on the output device 618.

The non-transitory computer readable storage medium disclosed herein stores computer program codes comprising instructions executable by at least one processor 611 for managing an incoming call during playing of media on the user device 601, without interrupting the playing of the media on the user device 601. The computer program codes comprise a first computer program code for receiving an indication of the incoming call during the playing of the media on the user device 601 via the graphical user interface (GUI) 610*a* provided on the user device 601; a second computer program code for generating a notification object with one or more call management options for the incoming call in one of the configurable formats based on preconfigured criteria; a third computer program code for overlaying the generated notification object with the call management options on the GUI 610*a*, while supporting continued playing of the media on the user device 601 via the GUI 610*a* without interruption by the incoming call; a fourth computer program code for receiving a selection of one of the call management options through the overlaid notification object from the user device 601 via the GUI 610*a* and processing the received selection of the call management option; and a fifth computer program code for performing one or more executable actions on one or more of the incoming call and the playing of the media on the user device 601 based on the processed selection of one of the call management options.

In an embodiment, the second computer program code comprises a sixth computer program code for configuring a calendar object to log the incoming call, the playing of the media on the user device 601, the executable actions performed on the incoming call and/or the playing of the media on the user device 601, and data comprising messages communicated between users, recordings of the media in the user device 601 and/or in the cloud computing environment, ratings of quality of the media, images, and social media, and create and schedule recording of the media and user events. In an embodiment, the fifth computer program code comprises a seventh computer program code for configuring the graphical user interface (GUI) 610*a* into a configurable number of interface sections to allow a recipient of the incoming call to execute one of the call management options during the playing of the media on the user device 601; and an eighth computer program code for executing one of the call management options on one of the interface sections of the GUI 610*a*, and continuing the playing of the media on another interface section of the GUI 610*a*. In another embodiment, the fifth computer program code further comprises a ninth computer program code for recording the media being played for later use in the user device 601 and/or in the cloud computing environment for a duration of the incoming call. In another embodiment, the fifth computer program code further comprises a tenth computer program code for reversibly replacing the audio component of the media being played with audio of the incoming call, while rendering the video component of the media being played on GUI 610*a* for a duration of the incoming call. In another embodiment, the fifth computer program code comprises an eleventh computer program code for reversibly configuring the GUI 610*a* into multiple interface sections for the playing of up to a predetermined number of the media simultaneously.

The computer program codes further comprise one or more additional computer program codes for performing additional steps that may be required and contemplated for managing an incoming call during playing of media on the user device 601, without interrupting the playing of the media on the user device 601. In an embodiment, a single piece of computer program code comprising computer executable instructions performs one or more steps of the method disclosed herein for managing an incoming call during playing of the media on the user device 601, without interrupting the playing of the media on the user device 601. The computer program codes comprising computer executable instructions are embodied on the non-transitory computer readable storage medium. The processor 611 of the user device 601 retrieves these computer executable instructions and executes them. When the computer executable instructions are executed by the processor 611, the computer executable instructions cause the processor 611 to perform the steps of the method for managing an incoming call during the playing of the media on the user device 601, without interrupting the playing of the media on the user device 601.

Figure 7A:
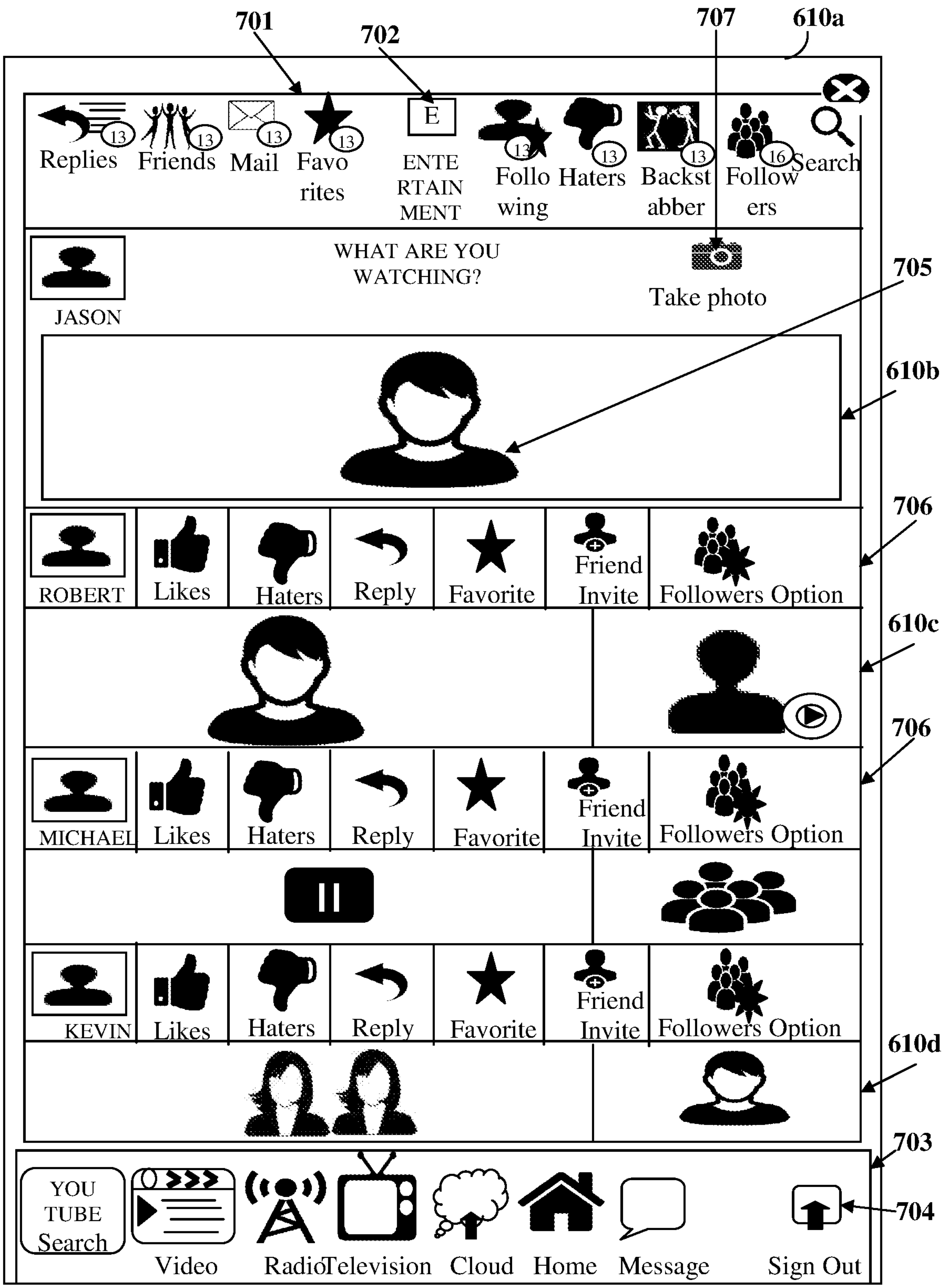
FIGS. 7A-7B exemplarily illustrate screenshots of a graphical user interface provided by the uninterrupted media play and call management system for performing social networking activities while viewing live broadcasts and streaming media on a user device.
Figure 7B:
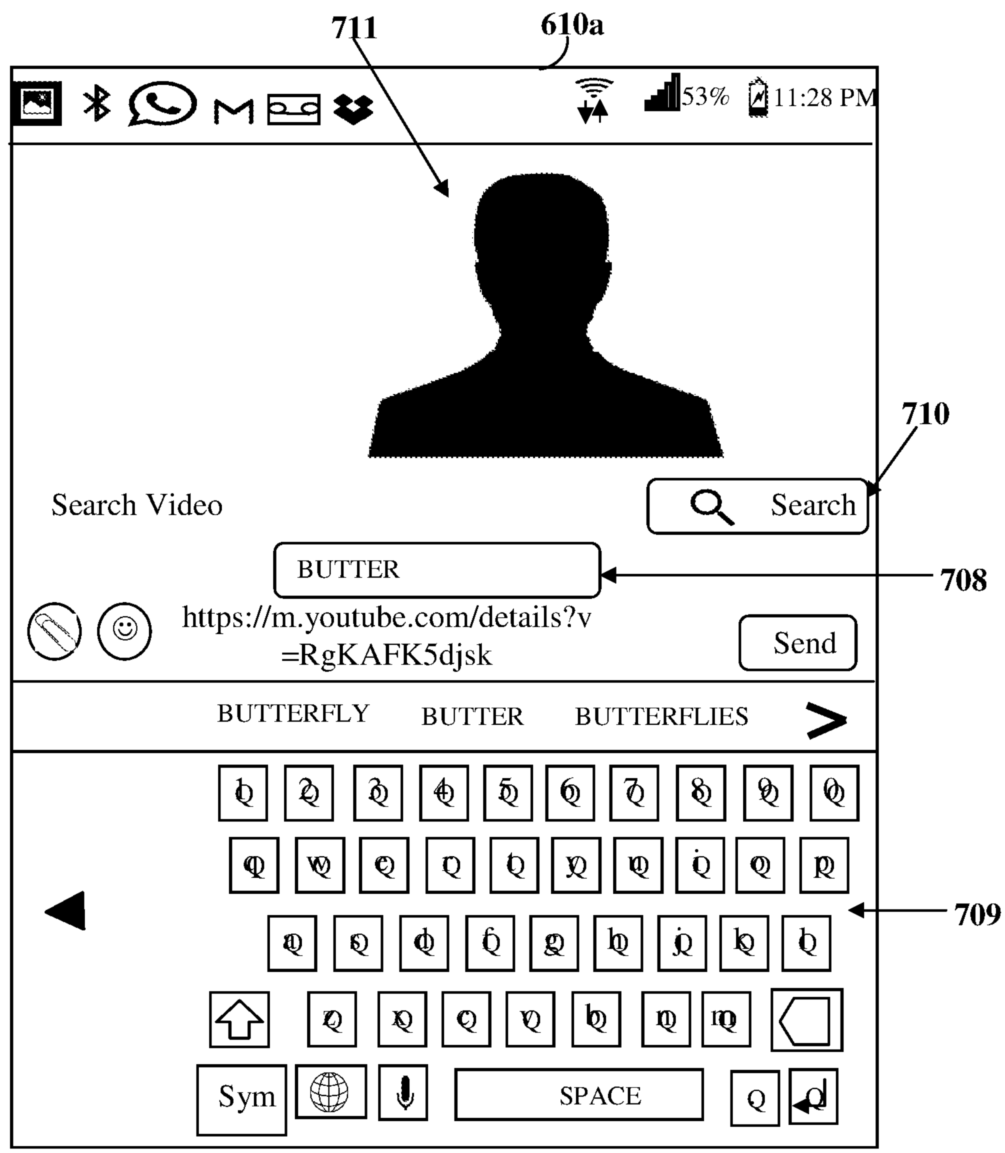

FIGS. 7A-7B exemplarily illustrate screenshots of the graphical user interface (GUI) 610*a* provided by the uninterrupted media play and call management system (UMPCMS) 603 exemplarily illustrated in FIG. 6, for performing social networking activities while viewing live broadcasts and streaming media on a user device 601. As exemplarily illustrated in FIG. 7A, a navigation section 701 is provided at the top of the GUI 610*a* for accessing different sections of the GUI 610*a*. On selecting an entertainment icon 702 in the navigation section 701, the UMPCMS 603 renders an activity section 703 as exemplarily illustrated at the bottom of the GUI 610*a*. The activity section 703 displays interface elements, for example, as icons for allowing a user to access and perform multiple activities via the GUI 610*a*. For example, the user can perform a YouTube® search, watch videos, listen to the radio, watch television shows, chat, etc., by selecting respective icons on the activity section 703. The user may therefore access live broadcasts and streaming media by selecting the entertainment icon 702 in the navigation section 701 of the GUI 610*a*. The UMPCMS 603 provides the user access to a selected activity via the GUI 610*a*. In an embodiment, the UMPCMS 603 reversibly configures the GUI 610*a* into multiple interface sections 610*b*, 610*c*, and 610*d* as exemplarily illustrated in FIG. 7A, for the playing of up to a predetermined number of the media simultaneously. For example, the user can watch up to three live broadcast events on the interface sections 610*b*, 610*c*, and 610*d* of the GUI 610*a*.

In an embodiment, the uninterrupted media play and call management system (UMPCMS) 603 allows the user to tap on shared broadcasting channels, videos, and photos, and expand them to play continuously on a predetermined number of separate interface sections 610*b*. 610*c*, and 610*d* as exemplarily illustrated in FIG. 7A, continuously with no incoming call interruptions. For example, a user can experience watching games of three different sports teams on a single GUI 610*a* that is split into three interface sections 610*b*, 610*c*, and 610*d*. The user may reply to a post on one of the interface sections 610*b*, 610*c*, and 610*d* by tapping an interface section twice and minimizing another interface section to display a post screen in the interface section that has been tapped. At this point there will be three interface sections 610*b*. 610*c*, and 610*d*: two interface sections showing videos being played and a third interface section where the user can type a post and send the post. Once the post is sent, the user can resume experiencing three videos on the interface sections 610*b*, 610*c*, and 610*d*. In an embodiment, the UMPCMS 603 allows a user to watch three live events on one user device 601 and communicate, for example, through social media, text, or a call. When there is a notification from a social media network, for example, via the Facebook® application programming interface (API), the live events being watched will not be interrupted. The operation is similar for both calls and text messages.

Furthermore, the graphical user interface (GUI) 610*a* displays a sign out icon 704 in the activity section 703 to allow the user to log out of the uninterrupted media play and call management system (UMPCMS) 603. The UMPCMS 603 allows the user to access shared media 705, where the shared media 705 is the media shared by the user with users of other user devices 622*a* and 622*b* exemplarily illustrated in FIG. 6, and media received by the user from the users of the other user devices 622*a* and 622*b* after activating the entertainment icon 702. The UMPCMS 603 receives and logs ratings, messages, and comments on the shared media 705 from the user's selection of options provided in a networking section 706 on the GUI 610*a*. The UMPCMS 603 also allows the user to bookmark media for easy retrieval at a later point of time through an option provided in the networking section 706. The user can perform imaging activities for subsequent sharing of resulting images with users of other user devices 622*a* and 622*b* through a photo icon 707 displayed on the GUI 610*a*.

Furthermore, during the playing of media via the graphical user interface (GUI) 601*a*, the uninterrupted media play and call management system (UMPCMS) 603 allows the user to search for media that the user intends to share by providing textual information about the media in a search box 708 using a keypad 709 displayed on the GUI 610*a* and clicking on a search button 710 displayed on the GUI 610*a* exemplarily illustrated in FIG. 7B. The UMPCMS 603 also provides an option to the user to view media and engage in social networking concurrently. As exemplarily illustrated in FIG. 7B, the GUI 610*a* is split into multiple interface sections, for example, to allow video play on one interface section and text communication on another interface section. When a video 711 is playing in a video player on the user device 601, the UMPCMS 603 implements a separate extensible markup language (XML) layout for text communication. In an embodiment, the UMPCMS 603 overlays a translucent text communication layout on a video player layout so that the video 711 is visible in the background of the translucent text communication layout. Splitting the GUI 610*a* allows multitasking on the user device 601.

Figure 8A:
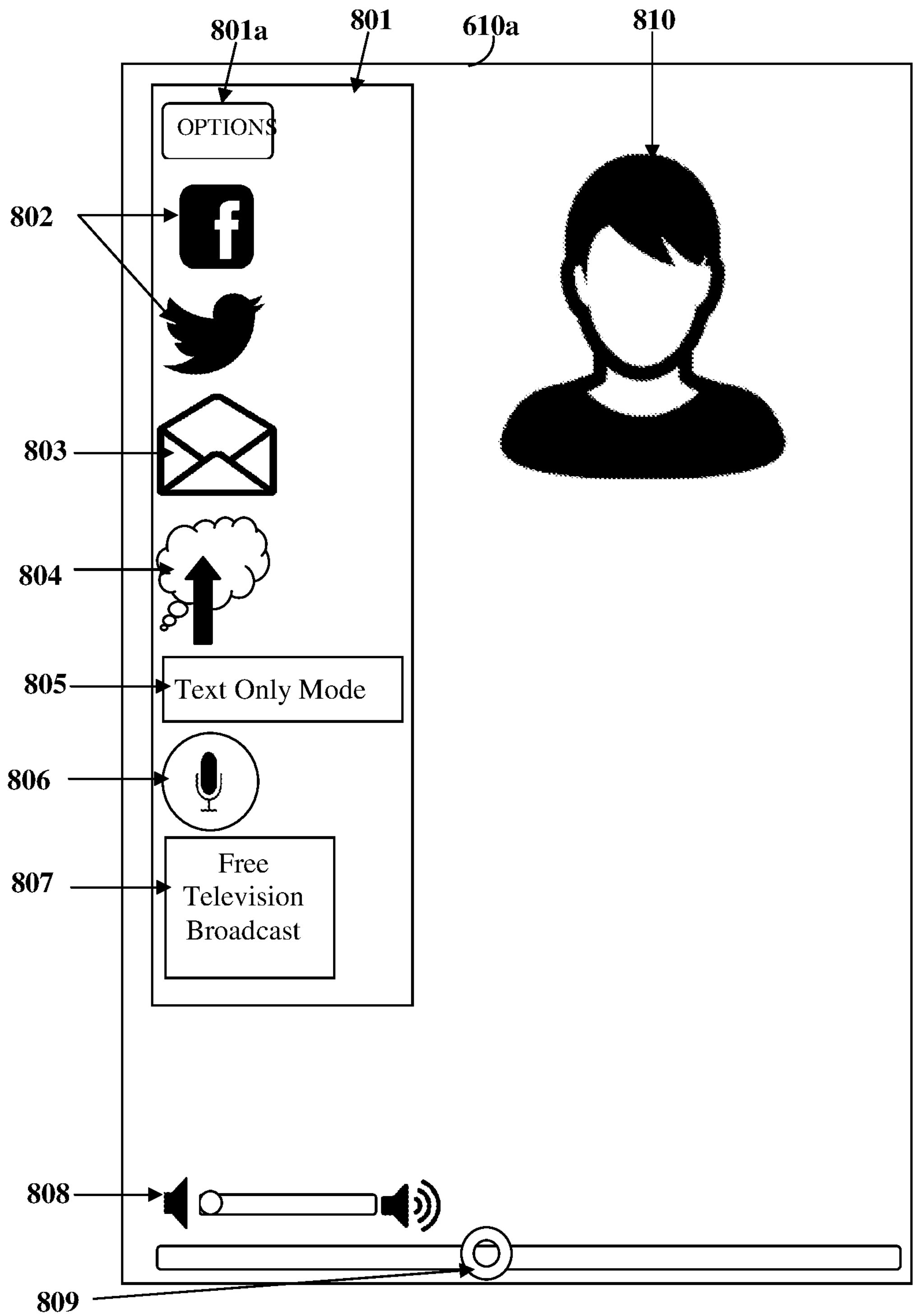
FIG. 8A exemplarily illustrates a screenshot of the graphical user interface provided by the uninterrupted media play and call management system for selecting media options on a user device.

FIG. 8A exemplarily illustrates a screenshot of the graphical user interface (GUI) 610*a* provided by the uninterrupted media play and call management system (UMPCMS) 603 for selecting media options on a user device 601 exemplarily illustrated in FIG. 6. The GUI 610*a* displays a list 801 of options connected with streaming media 810 on receiving a user input or on performance of a user interaction with the GUI 610*a*. The UMPCMS 603 hides this list 801 of options to allow non-intrusive viewing of the streaming media 810 on the GUI 610*a*. The UMPCMS 603 renders the options in the list 801, for example, as icons on the GUI 610*a* for selection by the user. The icons rendered by the UMPCMS 603 on the GUI 610*a* comprise, for example, social networking icons 802 for sharing the streaming media 810 with users of other user devices 622*a* and 622*b* exemplarily illustrated in FIG. 6, sending text communication to users of other user devices 622*a* and 622*b* or engaging in social networking through third party applications concurrently, etc., a messaging icon 803 for sending a text message to a user of another user device 622*a* or 622*b* while viewing the streaming media 810, a cloud icon 804 for recording the media 810 being streamed in a cloud computing environment, a record icon 806 for recording the streaming media 810 or only an audio component of the streaming media 810 for later use in the user device 601 and/or in the cloud computing environment, and a broadcast icon 807 for switching over to other available live broadcasts or streaming media. The icons rendered by the UMPCMS 603 on the GUI 610*a* further comprise a text only mode icon 805 for allowing only text communication for a duration of the streaming media 810 to support communication with prospective callers of incoming calls along with continued uninterrupted consumption of the streaming media 810.

The GUI 610*a* renders a volume button 808 to allow the user to control the volume of the streaming media 810 and a record button 809 to allow the user to record the streaming media 810 for later use in the user device 601 and/or in the cloud computing environment.

Furthermore, the uninterrupted media play and call management system (UMPCMS) 603 renders an options button 801*a* on the graphical user interface (GUI) 610*a* as exemplarily illustrated in FIG. 8A, to allow the user to click and display the list 801 of options, for example, on the left side of the GUI 610*a* in a vertical sidebar. In an embodiment, the options rendered to the user on receiving a click on the options button 801*a* comprises split screen options for social media communication while watching media, text communication, calendar access, a text only mode, recording of audio, sharing, connecting to a favorite live stream channel, social networking, etc. These options allow the user to multitask by watching a video on an interface section of the GUI 610*a* and connect to social media in another interface section. One of the options allows the user to split the GUI 610*a* to allow the user to select and perform activities simultaneously, for example, internet browsing using a web browser, accessing social media, communicating using text messages, viewing television channels, setting up a calendar event, etc. With this option, the UMPCMS 603 receives the user's selection of a split-screen configuration, for example, a split screen with three interface sections, for example, 610*b*, 610*c*, and 610*d* exemplarily illustrated in FIG. 7A, allowing the user to control the media that he/she can view on any of the interface sections 610*b*, 610*c*, and 610*d*. Each interface section comprises an options button to allow the user to control each interface section and what activity is performed in each interface section. The above options are provided without phone call interruptions and with an ability to respond through text messages or social media continuously.

Figure 8B:
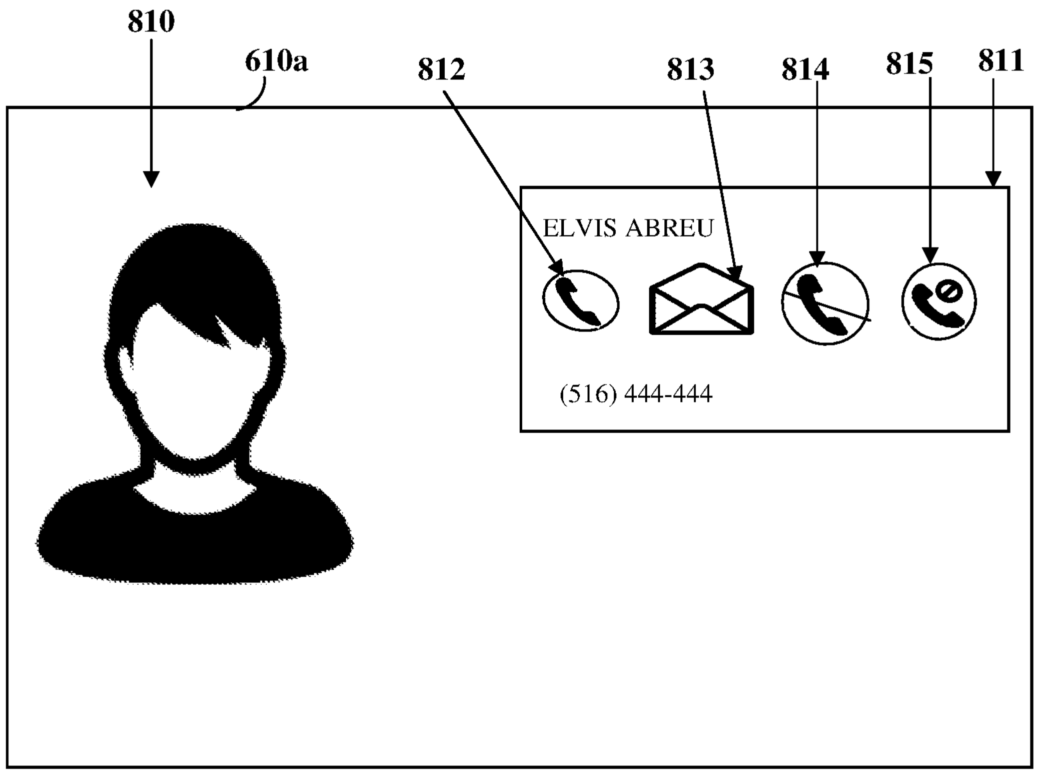
FIGS. 8B-8C exemplarily illustrate screenshots of the graphical user interface provided by the uninterrupted media play and call management system, showing overlaying of notification objects with call management options in different configurable formats on the graphical user interface for managing an incoming call, while supporting continued playing of media on the user device without interruption by the incoming call.
Figure 8C:
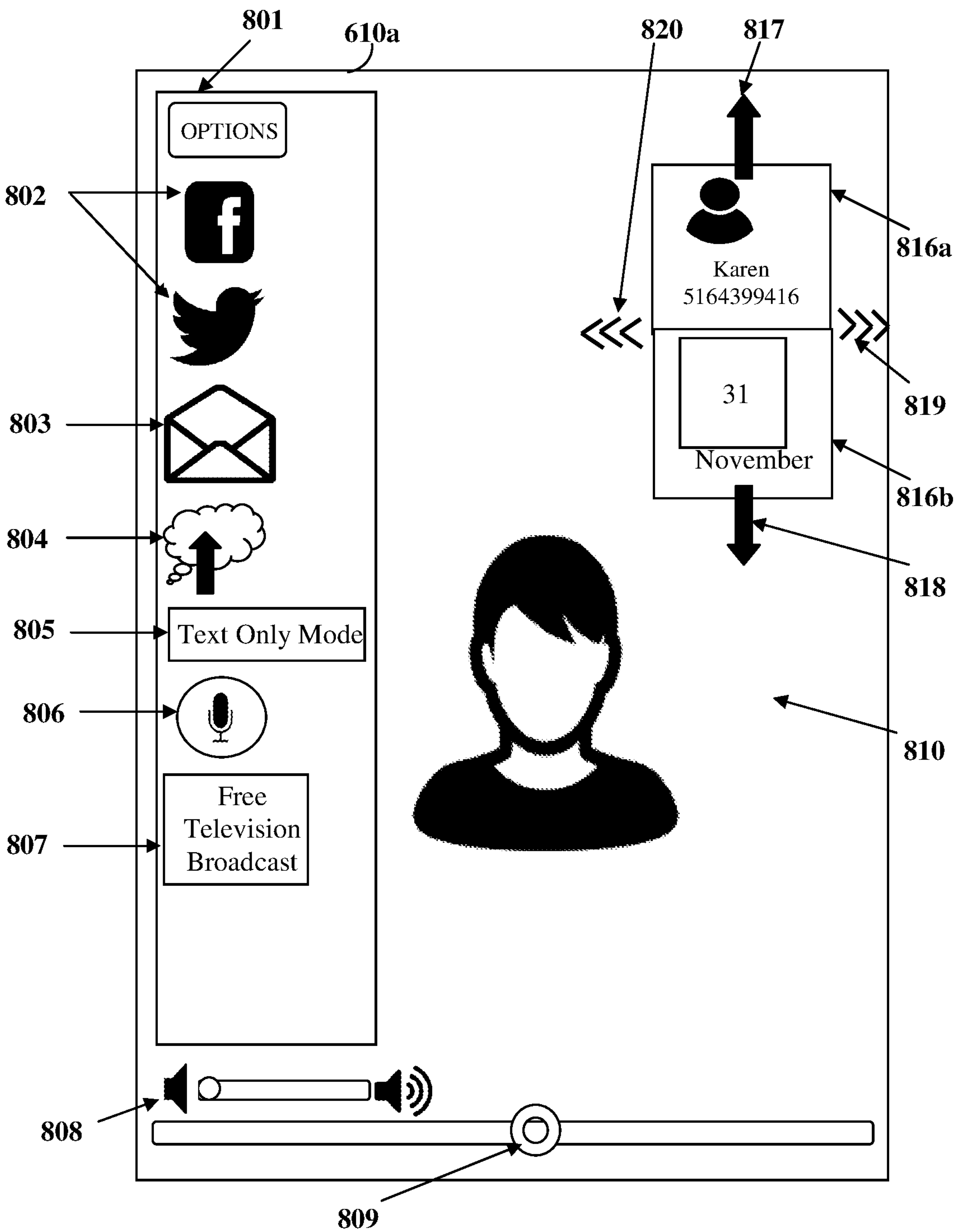

FIGS. 8B-8C exemplarily illustrate screenshots of the graphical user interface (GUI) 610*a* provided by the uninterrupted media play and call management system (UMPCMS) 603 exemplarily illustrated in FIG. 6, showing overlaying of notification objects 811 and 816 with call management options in different configurable formats on the GUI 610*a* for managing an incoming call, while supporting continued playing of media 810 on the user device 601 exemplarily illustrated in FIG. 6, without interruption by the incoming call. For example, FIG. 8B exemplarily illustrates a screenshot of the GUI 610*a*, showing overlaying of a blinder object 811 with call management options on the GUI 610*a* for managing an incoming call, while supporting continued playing of media 810 on the user device 601 without interruption by the incoming call. The blinder object 811 comprises interface elements configured, for example, as touch type icons, for example, an answer icon 812, a text icon 813, a block icon 814, and a reject icon 815 that represent the call management options. The user selects a call management option by touching one of the touch type icons, for example, 812, 813, 814, and 815 with a finger or any input device capable of providing a touch input. The user can accept a call by selecting the answer icon 812 and reject a call by selecting the reject icon 815 of the blinder object 811. When the user selects the text icon 813, the uninterrupted media play and call management system (UMPCMS) 603 configures the graphical user interface (GUI) 610*a* into a first interface section and a second interface section, where the streaming media 810 continues uninterrupted on the first interface section while the UMPCMS 603 allows the user to send a text message to the caller on the second interface section. When the user selects the block icon 814, the UMPCMS 603 blocks the call for a duration of the streaming media 810, while sending an automated message to a caller of the incoming call indicating an unavailability of the user device 601 for any communication for a duration of the media 810 being streamed.

FIG. 8C exemplarily illustrates a screenshot of the graphical user interface (GUI) 610*a* provided by the uninterrupted media play and call management system (UMPCMS) 603 exemplarily illustrated in FIG. 6, showing overlaying of a stamp object 816*a* and a calendar object 816*b* with call management options on the GUI 610*a* for managing an incoming call, while supporting continued playing of media 810 on the user device 601 exemplarily illustrated in FIG. 6, without interruption by the incoming call. The user may access the list 801 of options while streaming media 810 via the GUI 610*a* as disclosed in the detailed description of FIG. 8A. When the user of the user device 601 is a recipient of an incoming call during the play of the streaming media 810 on the user device 601, the UMPCMS 603 generates and overlays a stamp object 816*a* with identifiers of the caller, for example, a name of the caller and a phone number of the caller, and a calendar object 816*b* with the current a time and a date on the streaming media 810 on the GUI 610*a* as exemplarily illustrated in FIG. 8C.

The UMPCMS 603 also renders interface elements 817, 818, 819, and 820, for example, in the form of swipable arrows on the stamp object 816*a* and the calendar object 816*b* for receiving a selection of one of the call management options represented by the interface elements 817, 818, 819, and 820 from the user. The preconfigured criteria for generating the stamp object 816*a* and the calendar object 816*b* comprise blocking the incoming call and allowing only text communication. As exemplarily illustrated in FIG. 8C, the preconfigured criteria have not been selected by the user, since notification objects, for example, the stamp object 816*a* and the calendar object 816*b* has been generated by the UMPCMS 603 for the incoming call. The UMPCMS 603 overlays the stamp object 816*a* and the calendar object 816*b* as a translucent display on the GUI 610*a* to allow the user to view the streaming media 810 on the entire the GUI 610*a* where the streaming media 810 is being played. The calendar object 816*a* is configured by the UMPCMS 603 to log the incoming call, the playing of the media 810, and the executable actions performed by the UMPCMS 603 on the incoming call and/or the playing of the media 810, in addition to, logging messages communicated between users, recordings of the media 810 in the user device 601 and/or in the cloud computing environment, ratings of quality of the media 810, images, and social media, and create and schedule recording of the media 810 and user events.

The interface elements 817, 818, 819, and 820 for selecting one of the call management options in the stamp object 816*a* and the calendar object 816*b* are configured, for example, as swipable arrows for different call management options. The user of the user device 601 with the touch enabled display screen 610 exemplarily illustrated in FIG. 6, can select different call management options by swiping on the interface elements 817, 818, 819, and 820 with a finger or any other input device capable of providing a touch input on the stamp object 816*a* and the calendar object 816*b* in different directions. For example, an up arrow interface element 817 allows swiping upwards and indicates a selection of the call management option to send a text communication to a sender of the incoming interruptive call. A down arrow interface element 818 allows swiping downwards and indicates a selection of the call management option to send an automated message indicating an availability of the user device 601 only for text communication for the duration of the streaming media 810 being played. A right arrow interface element 819 allows swiping to the right and indicates a selection of the call management option to accept the incoming call. A left arrow interface element 820 allows swiping to the left and indicates a selection of the call management option to reject the incoming interruptive call.

Figure 9:
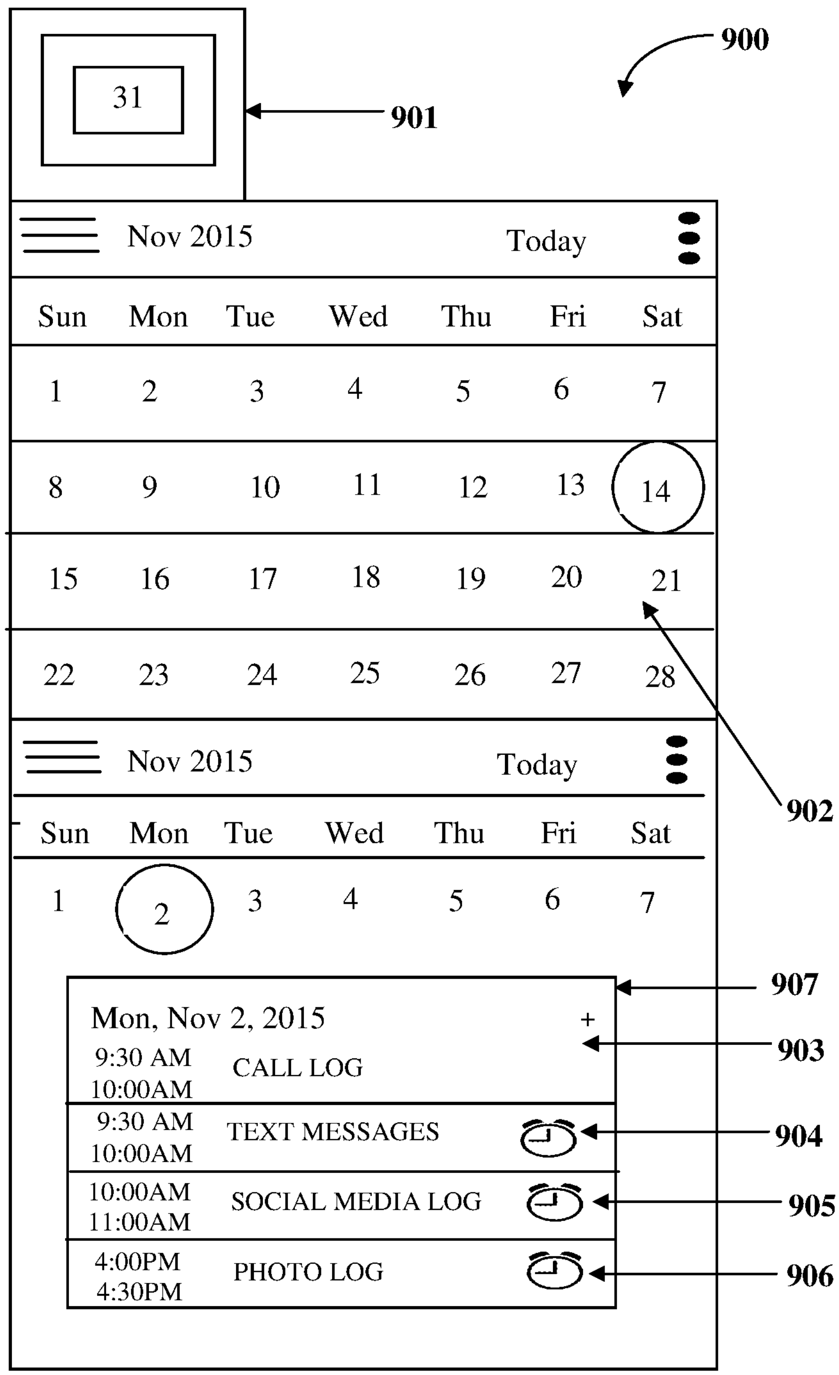
FIG. 9 exemplarily illustrates a calendar user interface of a calendar object generated by the uninterrupted media play and call management system for displaying logs of activities performed on the user device and creating and scheduling recording of live broadcast events and user events.

FIG. 9 exemplarily illustrates a calendar user interface 900 of a calendar object 816*b* exemplarily illustrated in FIG. 8B, generated by the uninterrupted media play and call management system (UMPCMS) 603 exemplarily illustrated in FIG. 6, for displaying logs of activities performed on the user device 601 exemplarily illustrated in FIG. 6, and creating and scheduling recording of live broadcast events and user events. On clicking the calendar object 816*b* on the graphical user interface (GUI) 610*a* exemplarily illustrated in FIG. 8B, the UMPCMS 603 renders the calendar user interface 900 comprising a date icon 901 that displays current date and a calendar section 902 depicting dates, days of the week, months, and years along with scheduled user events. A user can create user events through an option provided in the calendar section 902. The calendar user interface 900 further comprises a log section 907 organized according to dates of corresponding activities on the user device 601. The log section 907 comprises a call log 903 and message log 904 that store all communication received by and originated from the user device 601 and a log of duration of the communication. The call log 903 and the message log 904 provide logs of voice calls and text messages respectively, sent from or received by the user of the user device 601. The log section 907 further comprises a social media log 905 comprising messages sent by the user, messages received by the user, and media shared between the user and users of other user devices 622*a* and 622*b* exemplarily illustrated in FIG. 6, for social networking while viewing live broadcasts and streaming media. The log section 907 further comprises a photo log 906 of all images or photos captured through imaging activities on the user device 601 and a log of photos and other media sent to and received from users of other user devices 622*a* and 622*b* by the user of the user device 601. The user can access the call log 903, the message log 904, the social media log 905, and the photo log 906 via the log section 907 displayed on the calendar user interface 900.

It will be readily apparent in different embodiments that the various methods, algorithms, and computer programs disclosed herein are implemented on computer readable media appropriately programmed for computing devices. As used herein, "computer readable media" refers to non-transitory computer readable media that participate in providing data, for example, instructions that are read by a computer, a processor or a similar device. The "computer-readable media" further refers to a single medium or multiple media, for example, a centralized database, a distributed database, and/or associated caches and servers that store one or more sets of instructions that are read by a computer, a processor or a similar device. The "computer-readable media" further refers to any medium capable of storing or encoding a set of instructions for execution by a computer, a processor or a similar device and that causes a computer, a processor or a similar device to perform any one or more of the methods disclosed herein. Non-transitory computer readable media comprise all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that could be used comprise C. C++, C#, Java, JavaScript, Fortran. Ruby, Peal, Python. Visual Basic®, hypertext preprocessor (PHP), Microsoft®.NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the uninterrupted media play and call management system (UMPCMS) 603 exemplarily illustrated in FIG. 6, disclosed herein are implemented in a non-programmed environment comprising documents created, for example, in a hypertext markup language (HTML), an extensible markup language (XML), or other format that render design layouts and aspects of the graphical user interface (GUI) 610*a* exemplarily illustrated in FIG. 6, or perform other functions, when viewed in a visual area or a window of a browser program. In another embodiment, various aspects of the method and the UMPCMS 603 disclosed herein are implemented as programmed elements, or non-programmed elements, or any suitable combination thereof. The computer program product disclosed herein comprises one or more computer program codes for implementing the processes of various embodiments.

Where databases are described such as the database 608, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the uninterrupted media play and call management system 603, the databases are integrated to communicate with each other for enabling simultaneous updates of data linked across the databases, when there are any updates to the data in one of the databases.

The method and the uninterrupted media play and call management system (UMPCMS) 603 disclosed herein can be configured to work in a network environment comprising one or more computers that are in communication with one or more devices via a network 621 exemplarily illustrated in FIG. 6. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the network 621. Each of the computers and the devices executes an operating system, examples of which are disclosed above. While the operating system may differ depending on the type of computer, the operating system provides the appropriate communications protocols to establish communication links with the network 621. Any number and type of machines may be in communication with the computers.

The method and the uninterrupted media play and call management system (UMPCMS) 603 disclosed herein are not limited to a particular computer system platform, processor, operating system, or network. In an embodiment, one or more aspects of the method and the UMPCMS 603 disclosed herein are distributed among one or more computer systems, for example, servers configured to provide one or more services to one or more client computers, or to perform a complete task in a distributed system. For example, one or more aspects of the method and the UMPCMS 603 disclosed herein are performed on a client-server system that comprises components distributed among one or more server systems that perform multiple functions according to various embodiments. These components comprise, for example, executable, intermediate, or interpreted code, which communicate over the network 621 using a communication protocol. The method and the UMPCMS 603 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the uninterrupted media play and call management system (UMPCMS) 603 disclosed herein. While the method and the UMPCMS 603 have been described with reference to various embodiments, it is understood that the words, which have been used herein, are words of description and illustration, rather than words of limitation. Further, although the method and the UMPCMS 603 have been described herein with reference to particular means, materials, and embodiments, the method and the UMPCMS 603 are not intended to be limited to the particulars disclosed herein; rather, the method and the UMPCMS 603 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the UMPCMS 603 disclosed herein in their aspects.

The invention claimed is:

1. An apparatus for allowing a user to perform social networking activities while viewing live broadcasts and streaming media on a user device without interruption by an incoming phone call from a caller, the apparatus comprising:

- a radio frequency unit configured to connect to a network and to receive the incoming phone call via the network;
- at least one output device configured to vibrate on receiving the incoming phone call;
- a touch enabled display screen configured to present a graphical user interface (GUI); and
- a processor electrically connected to the radio frequency unit, the output device, and the touch enabled display screen, wherein the processor is configured to:
  - receive the incoming phone call;
  - overlay a navigation section on the GUI to access different sections of the GUI;
  - allow the user to select an entertainment icon in the navigation section for accessing live broadcasts and streaming media;
  - render an activity section, on the GUI upon selecting the entertainment icon, wherein the activity section displays a plurality of interface elements;
  - allow the user to select one of the plurality of interface elements to perform multiple activities on the GUI;
  - reversibly configure the GUI into multiple interface sections for the playing of a predetermined number of the live broadcasts and streaming media simultaneously;
  - continue the playing predetermined number of the live broadcasts and streaming media on the multiple interface sections; and
  - perform social networking activities while viewing live broadcasts and streaming media on the user device without interruption by the incoming phone call.

2. The apparatus of claim 1, wherein the social networking activities include YouTube® search, watch videos, listen to the radio, watch television shows and chat.

3. The apparatus of claim 1, wherein the social networking activities further includes posting reply to one of the media being played on the multiple interface sections and accessing media shared by other users.

4. The apparatus of claim 3, wherein the user replies to the post on one of the interface sections by tapping an interface section twice and minimizing another interface section to display a post screen in the interface section that has been tapped.

5. The apparatus of claim 1, wherein the plurality of interface elements include a plurality of icons.

6. The apparatus of claim 1, wherein the processor is further configured to receive and log rating, message, and comment on the shared media in a networking section of the GUI.

7. The apparatus of claim 1, wherein the processor is further configured to bookmark media for easy retrieval at a later point of time through an option provided in the networking section.

8. The apparatus of claim 1, wherein the processor is further configured to display a sign out icon in the activity section to allow the user to log out of the uninterrupted media play and call management.

9. The apparatus of claim 1, wherein the social networking activities further includes imaging activities performed by the user for subsequent sharing of resulting images with other users through a photo icon displayed on the GUI.

10. The apparatus of claim 1, wherein the social networking activities further includes searching for media that the user intends to share by providing textual information about the media in a search box using a keypad displayed on the GUI and clicking on a search button displayed on the GUI.

11. The apparatus of claim 1, wherein the processor is further configured to split the GUI into multiple interface sections to allow video play on one interface section and text communication on another interface section.

12. The apparatus of claim 1, wherein the processor is further configured to overlay a translucent text communication layout on a video player layout so that the video is visible in the background of the translucent text communication layout.

13. The apparatus of claim 1, wherein the processor is further configured to allow the user to share broadcasting channels, photos, videos, and post or rate whether they like or hate media to friends, persons referred to as backstabbers in the navigation section.

14. The apparatus of claim 1, wherein the processor is further configured to display a list of options, as icons, connected with streaming media on receiving a user input or on performance of a user interaction with the GUI.

15. The apparatus of claim 14, wherein the icons include social networking icons for sharing the streaming media, sending text communication or engaging in social networking through third party applications, a messaging icon for sending a text message while viewing the streaming media, a cloud icon for recording the media being streamed in a cloud computing environment, a record icon for recording the streaming media or only an audio component of the streaming media for later use in the user device and/or in the cloud computing environment, a broadcast icon for switching over to other available live broadcasts or streaming media, a text only mode icon for allowing only text communication for a duration of the streaming media.

16. The apparatus of claim 1, wherein the processor is further configured to render a volume button on the GUI to allow the user to control the volume of the streaming media.

17. A method for allowing a user to perform social networking activities while viewing live broadcasts and streaming media on a user device without interruption by an incoming phone call from a caller, the method comprising:

receiving the incoming phone call;

overlaying a navigation section on the GUI to access different sections of the GUI;

allowing the user to select an entertainment icon in the navigation section for accessing live broadcasts and streaming media;

rendering an activity section, on the GUI upon selecting the entertainment icon, wherein the activity section displays a plurality of interface elements;

allowing the user to select one of the plurality of interface elements to perform multiple activities on the GUI;

reversibly configuring the GUI into multiple interface sections for the playing of a predetermined number of the live broadcasts and streaming media simultaneously;

continue the playing predetermined number of the live broadcasts and streaming media on the multiple interface sections without interruption; and perform social networking activities while viewing live broadcasts and streaming media on the user device without interruption by the incoming phone call.

18. The method of claim 17, wherein the social networking activities include YouTube® search, watch videos, listen to the radio, watch television shows and chat.

19. The method of claim 17, wherein the social networking activities further includes posting reply to one of the media being played on the multiple interface sections and accessing media shared by other users.

20. The method of claim 19, wherein the user replies to the post on one of the interface sections by tapping an interface section twice and minimizing another interface section to display a post screen in the interface section that has been tapped.

21. The method of claim 17, wherein the plurality of interface elements include a plurality of icons.

22. The method of claim 17 further comprising a step of receiving and logging rating, messaging, and commenting on the shared media in a networking section of the GUI.

23. The method of claim 17 further comprising a step of bookmarking the media for easy retrieval at a later point of time through an option provided in the networking section.

24. The method of claim 17 further comprising a step of displaying a sign out icon in the activity section to allow the user to log out of the uninterrupted media play and call management.

25. The method of claim 17, wherein the social networking activities further includes imaging activities performed by the user for subsequent sharing of resulting images with other users through a photo icon displayed on the GUI.

26. The method of claim 17, wherein the social networking activities further includes searching for media that the user intends to share by providing textual information about the media in a search box using a keypad displayed on the GUI and clicking on a search button displayed on the GUI.

27. The method of claim 17 further comprising a step of splitting the GUI into multiple interface sections to allow video play on one interface section and text communication on another interface section.

28. The method of claim 17 further comprising a step of overlaying a translucent text communication layout on a video player layout so that the video is visible in the background of the translucent text communication layout.

29. The method of claim 17 further comprising a step of allowing the user to share broadcasting channels, photos, videos, and post or rate whether they like or hate media to friends, persons referred to as backstabbers in the navigation section.

30. The method of claim 17 further comprising a step of displaying a list of options, as icons, connected with streaming media on receiving a user input or on performance of a user interaction with the GUI.

31. The method of claim 30, wherein the icons include social networking icons for sharing the streaming media, sending text communication or engaging in social networking through third party applications, a messaging icon for sending a text message while viewing the streaming media, a cloud icon for recording the media being streamed in a cloud computing environment, a record icon for recording the streaming media or only an audio component of the streaming media for later use in the user device and/or in the cloud computing environment, a broadcast icon for switching over to other available live broadcasts or streaming media, a text only mode icon for allowing only text communication for a duration of the streaming media.

32. The method of claim 17 further comprising a step of rendering a volume button on the GUI to allow the user to control the volume of the streaming media.

* * * * *